United States Patent [19]

Schwarz, Jr.

[11] Patent Number: 5,300,143
[45] Date of Patent: Apr. 5, 1994

[54] INK COMPOSITIONS FOR INK JET PRINTING

[75] Inventor: William M. Schwarz, Jr., Webster, N.Y.

[73] Assignee: Xerox Corporation, Stamford, Conn.

[21] Appl. No.: 991,928

[22] Filed: Dec. 17, 1992

Related U.S. Application Data

[63] Continuation-in-part of Ser. No. 738,024, Jul. 30, 1991, Pat. No. 5,223,026.

[51] Int. Cl.⁵ .............................................. C09D 11/02
[52] U.S. Cl. .............................. 106/22 H; 106/20 D; 106/22 R
[58] Field of Search ................. 106/20 R, 22 R, 22 H, 106/20 D

[56] References Cited

U.S. PATENT DOCUMENTS

| | | | |
|---|---|---|---|
| 4,585,484 | 4/1986 | Haruta et al. | 106/22 R |
| 4,627,875 | 6/1986 | Kobayashi et al. | 106/22 H |
| 4,790,880 | 6/1988 | Miller | 106/20 D |
| 4,836,851 | 6/1989 | Paulowski et al. | 106/20 |
| 4,840,674 | 6/1989 | Schwarz | 106/22 E |
| 4,975,117 | 12/1990 | Tabayashi et al. | 106/20 D |
| 5,006,170 | 4/1991 | Schwarz et al. | 106/20 D |
| 5,017,223 | 5/1991 | Kobayashi et al. | 106/20 B |
| 5,017,227 | 5/1991 | Koike et al. | 106/22 C |
| 5,019,166 | 5/1991 | Schwarz | 106/20 D |
| 5,100,471 | 3/1992 | Winnik et al. | 106/32 |
| 5,106,416 | 4/1992 | Moffatt et al. | 106/30 B |
| 5,108,503 | 4/1992 | Hindagolia et al. | 106/22 R |
| 5,169,438 | 12/1992 | Matrick | 106/499 |
| 5,173,112 | 12/1992 | Matrick et al. | 106/20 D |

FOREIGN PATENT DOCUMENTS 0434179 6/1991 European Pat. Off. .
27762 2/1983 Japan .

*Primary Examiner*—Helene Klemanski
*Attorney, Agent, or Firm*—Judith L. Byorick

[57] ABSTRACT

Disclosed is an ink composition which comprises water, a water soluble dye, a first component selected from the group consisting of sulfones and mixtures thereof, and a second component selected from the group consisting of cyclic amines having at least one hydrogen atom bonded to a nitrogen atom, cyclic amides having at least one hydrogen atom bonded to a nitrogen atom, di-amides having at least one hydrogen atom bonded to a nitrogen atom, polyalkoxy-substituted amides having at least one hydrogen atom bonded to a nitrogen atom, polyimine-substituted amides having at least one hydrogen atom bonded to a nitrogen atom, and mixtures thereof. Also disclosed is an ink jet printing process employing these inks.

37 Claims, No Drawings

INK COMPOSITIONS FOR INK JET PRINTING

This application is a continuation-in-part of copending application U.S. Ser. No. 07/738,024 filed Jul. 30, 1991, now U.S. Pat. No. 5,223,026 entitled "Ink Jet Compositions and Processes", the disclosure of which is totally incorporated herein by reference.

BACKGROUND OF THE INVENTION

The present invention is directed to ink compositions. More specifically, the present invention is directed to waterfast ink compositions particularly suited for ink jet printing processes. One embodiment of the present invention is directed to an ink composition which comprises water, a water-soluble dye, a first component selected from the group consisting of sulfones and mixtures thereof, and a second component selected from the group consisting of cyclic amines having at least one hydrogen atom bonded to a nitrogen atom, cyclic amides having at least one hydrogen atom bonded to a nitrogen atom, diamides having at least one hydrogen atom bonded to a nitrogen atom, polyalkoxy-substituted or polyimine-substituted amides having at least one hydrogen atom bonded to a nitrogen atom, and mixtures thereof.

Ink compositions for ink jet printing are known. For example, U.S. Pat. No. 5,017,227 (Koike et al.) discloses a recording liquid comprising dyes and a liquid medium, wherein the dyes include a black dye and at least one water-soluble dye of a magenta dye and a yellow dye in combination. The black dye is selected from the group C.I. Food Black 1, C.I. Acid Black 140, and C.I. Acid Black 187. The liquid medium is water-based, and can contain a water-soluble organic solvent. Examples of water-soluble organic solvents include alkyl alcohols having 1 to 5 carbon atoms, amides such as dimethylformamide and dimethylacetamide, ketones or ketoalcohols such as acetone or diacetone alcohol, ethers such as tetrahydrofuran and dioxane, polyalkylene glycols such as polyethylene glycol and polypropylene glycol, alkylene glycols comprising an alkylene group having 2 to 6 carbon atoms, glycerol, lower alkyl ethers of polyhydric alcohols, lower dialkyl ethers of polyhydric alcohols, sulfolane, N-methyl-2-pyrrolidone, and 1,3-dimethyl-2-imidazolidinone.

U.S. Pat. No. 5,017,223 (Kobayashi et al.) is directed to a recording material including at least a liquid dispersion medium and an electrolyte contained therein, the electrolyte providing substantially no halogen ion in the liquid dispersion medium under electrolytic dissociation and the recording material being capable of changing its adhesiveness when imparted with a voltage by means of a pair of electrodes, thereby to adhere selectively to either one of the pair of electrodes. The liquid dispersion medium preferably comprises a polyhydric alcohol or polyol solvent. Also suitable are water, triethanolamine, formamide, dimethylformamide, dimethylsulfoxide, N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, gamma-butyrolactone, propylene carbonate, and the like. These compounds may be used singly or as a mixture of two or more species.

U.S. Pat. No. 4,836,851 (Pawlowski et al.) discloses a dye used in ink compositions for ink jet printing which comprises an aromatic dye molecule having attached to the backbone thereof from one to four polyhydroxyl-substituted groups of specific formulae. The dyes have improved water solubility and improved interaction with paper. The dyes are useful in ink compositions comprising the dye, water, and a water miscible organic solvent. Examples of organic solvents include diethylene glycol, triethylene glycol, polyethylene glycol, propylene glycol, monomethyl ether, 1,2-dimethoxypropane, an alcohol such as methanol, sulfolane, formamide, N-methyl-2-pyrrolidone, propylene carbonate, oxidipropionitrile, or mixtures thereof.

U.S. Pat. No. 4,790,880 (Miller) discloses an ink suitable for use in ink jet printers including (a) a vehicle comprising at least one member selected from the group consisting of water and a water soluble nonaqueous component, and (b) an anionic dye having cations associated therewith. The ink further includes a macrocyclic polyether associated with the cations, the macrocyclic polyether having binding sites and a cavity size suitable for complexing the cations. The ink composition evidences reduced crusting, increased fade resistance, and reduced kogation. The ink vehicle can include water and/or one or more glycols, and may also comprise water and one or more other water soluble nonaqueous components. Examples of other water soluble nonaqueous components include short chain alcohols such as isopropanol, alkanol amines, such as mono, di, and triethanolamine, amides, such as formamide and dimethyl formamide, sulfoxides such as dimethylsulfoxide, sulfones such as sulfolane, and heterocyclic amines such as N-methyl-2-pyrrolidone and 1,3-dimethylimidazolidinone.

U.S. Pat. No. 4,627,875 (Kobayashi et al.) discloses a recording liquid which comprises C.I. Acid Red 8 as a recording agent for forming an image and a liquid medium comprising at least (a) a member selected from the group consisting of polyethylene glycol, polyethylene glycol monomethyl ether, and a mixture thereof, (b) a member selected from the group consisting of diethylene glycol, sulfolane, and a mixture thereof, (c) a member selected from the group consisting of N-methyl-2-pyrrolidone, 1,3-dimethyl-2-imidazolidinone, and a mixture thereof, and (d) water.

U.S. Pat. No. 4,585,484 (Haruta et al.) discloses a recording liquid comprising a dye selected from C.I. Direct Blue 199, C.I. Direct Yellow 86, and C.I. Food Black 2 as the recording agent for forming an image and a liquid medium for dissolving or dispersing the recording agent therein, the liquid medium comprising at least (a) either one or both of polyethylene glycol and polyethylene glycol monomethyl ether, (b) either one or both of diethylene glycol and sulfolane, (c) either one or both of N-methyl-2-pyrrolidone and 1,3-dimethyl-2-imidazolidinone, and (d) water.

U.S. Pat. No. 4,840,674 (Schwarz) discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,108,503 (Hindagolla et al.) discloses inks for ink jet printing having improved water resistance and smear resistance when they contain from about 2.5 to 25 percent by weight, preferably from about 7.5 to about 12.5 percent by weight, of 2-pyrrolidone, N-(2-hydroxyethyl)-2-pyrrolidone, or mixtures thereof.

Copending application U.S. Ser. No. 07/738,024, entitled "Ink Jet Compositions and Processes", with the named inventor William M. Schwarz, filed Jul. 30, 1991, the disclosure of which is totally incorporated herein by reference, discloses a thermal ink jet printing process which comprises incorporating into a thermal ink jet printing apparatus an ink composition comprising a colorant and a liquid vehicle which comprises a mixture of water and an organic component selected from the group consisting of: (1) cyclic amides of the formula

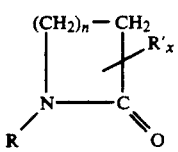

wherein n is a number from 2 to about 12; R is hydrogen, alkyl or substituted alkyl with from 1 to about 6 carbon atoms, a polyethoxy group of the formula

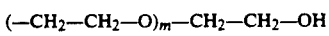
$(-CH_2-CH_2-O)_m-CH_2-CH_2-OH$ with m being a number of from 0 to about 9, or a polyimine group of the formula

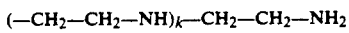
$(-CH_2-CH_2-NH)_k-CH_2-CH_2-NH_2$ with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (2) a cyclic amide of the formula

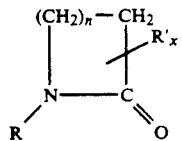

wherein n is a number of from 1 to about 12, R is a cyclohexyl group or a butyl group, and R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (3) cyclic esters of the formula

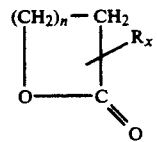

wherein n is a number of from 1 to about 12, R represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (4) amides of the formula

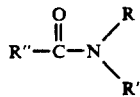

wherein R and R' are hydrogen atoms, alkyl groups, or substituted alkyl groups with from 2 to about 20 carbon atoms, polyethoxy groups of the formula

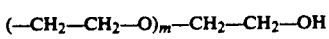
$(-CH_2-CH_2-O)_m-CH_2-CH_2-OH$ with m being a number of from 0 to about 9, or polyimine groups of the formula

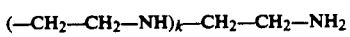
$(-CH_2-CH_2-NH)_k-CH_2-CH_2-NH_2$ with k being a number of from 0 to about 9, wherein R and R' can be bonded to each other to form a ring, and wherein R" is hydrogen or alkyl, with alkyl preferably having from 1 to about 20 carbon atoms; and mixtures thereof; and heating selected nozzles in the printing apparatus containing the ink, thereby causing droplets of the ink to be ejected in an imagewise pattern onto a substrate.

Although known ink compositions and ink jet printing processes are suitable for their intended purposes, a need remains for ink compositions with enhanced waterfastness. In addition, there is a need for waterfast inks with lowered viscosity. Further, a need exists for waterfast inks which generate images exhibiting enhanced edge sharpness. Additionally, there is a need for waterfast inks with enhanced drying rates. There is also a need for ink compositions which exhibit high frequency response in ink jet printing systems. A need also exists for ink compositions exhibiting both relatively low viscosity and relatively high surface tension. In addition, there is a need for ink compositions which do not exhibit rapid drying or clogging within the nozzles of an ink jet printer. Further, there is a need for ink compositions which exhibit good shelf stability. Additionally, there is a need for ink compositions wherein the ink components do not react with each other to any significant degree over time.

SUMMARY OF THE INVENTION

It is an object of the present invention to provide an ink composition with at least some of the above advantages.

It is another object of the present invention to provide ink compositions with enhanced waterfastness.

It is yet another object of the present invention to provide waterfast inks with lowered viscosity.

It is still another object of the present invention to provide waterfast inks which generate images exhibiting enhanced edge sharpness.

Another object of the present invention is to provide waterfast inks with enhanced drying rates.

Yet another object of the present invention is to provide ink compositions which exhibit high frequency response in ink jet printing systems.

Still another object of the present invention is to provide ink compositions exhibiting both relatively low viscosity and relatively high surface tension.

It is another object of the present invention to provide ink compositions which do not exhibit rapid drying or clogging within the nozzles of an ink jet printer.

It is yet another object of the present invention to provide ink compositions which exhibit good shelf stability.

It is still another object of the present invention to provide ink compositions wherein the ink components do not react with each other to any significant degree over time.

These and other objects of the present invention (or specific embodiments thereof) can be achieved by providing an ink composition which comprises water, a water soluble dye, a first component selected from the group consisting of sulfones and mixtures thereof, and a second component selected from the group consisting of cyclic amines having at least one hydrogen atom bonded to a nitrogen atom, cyclic amides having at least one hydrogen atom bonded to a nitrogen atom, diamides having at least one hydrogen atom bonded to a nitrogen atom, polyalkoxy-substituted amides having at least one hydrogen atom bonded to a nitrogen atom, polyimine-substituted amides having at least one hydrogen atom bonded to a nitrogen atom, and mixtures thereof, wherein at least one of the first and second components is a solid at 25° C. Another embodiment of the present invention is directed to an ink composition which comprises water, a water soluble dye, a first component selected from the group consisting of (a) sulfones of the formula

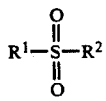

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

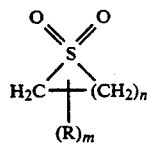

wherein R is an optional substituent, m is an integer representing the number of substituents, and n is an integer of at least about 4; (c) cyclic sulfones of the formula

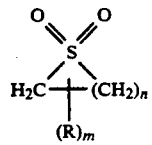

wherein R is a substituent selected from the group consisting of alkyl, hydroxy, alcohol, or alkoxy, m is an integer representing the number of substituents, and n is an integer of at least about 2; (d) cyclic sulfones of the formula

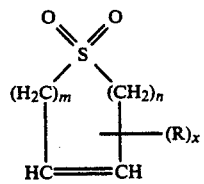

wherein R is an optional substituent, x is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component selected from the group consisting of (a) cyclic amines having at least one hydrogen atom bonded to a nitrogen atom; (b) cyclic amides having at least one hydrogen atom bonded to a nitrogen atom; (c) diamides having at least one hydrogen atom bonded to a nitrogen atom; (d) amides of the formula

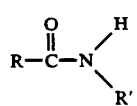

wherein R is a hydrogen atom or an alkyl group and R' is selected from the group consisting of alkoxy groups, polyalkoxy groups, imine groups, and polyimine groups. Yet another embodiment of the present invention is directed to an ink composition which comprises water, a water soluble dye, a first component selected from the group consisting of sulfones and mixtures thereof, and a second component selected from the group consisting of (a) cyclic amines; (b) cyclic polyamines; (c) cyclic amides of the formula

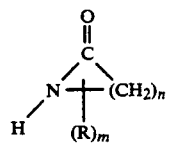

wherein R is an optional substituent, m is an integer representing the number of substituents, and n is an integer of at least about 4; (d) cyclic amides of the formula

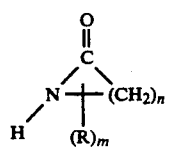

wherein R is a substituent selected from the group consisting of alkyl, alcohol, hydroxy, and alkoxy, m is an integer representing the number of substituents, and n is an integer of at least about 3; (e) cyclic amides of the formula

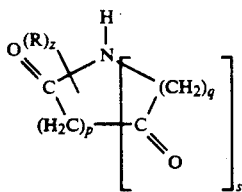

wherein R is an optional substituent, z is an integer representing the number of substituents, p and q are each integers selected from the group consisting of 0, 1, 2, 3, and 4, wherein the sum of p+q is at least about 1, and s is an integer of from 1 to about 4; (f) cyclic amides of the formula

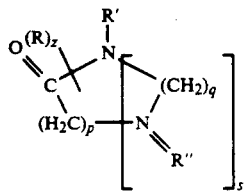

wherein R is an optional substituent, z is an integer representing the number of substituents, p and q are each integers selected from the group consisting of 0, 1, 2, 3, and 4, wherein the sum of p+q is at least about 1, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; (g) cyclic polyamides; (h) diamides having at least one hydrogen atom bonded to a nitrogen atom; (i) amides of the formula,

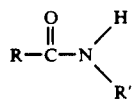

wherein R is a hydrogen atom or an alkyl group and R' is selected from the group consisting of alkoxy groups, polyalkoxy groups, imine groups, and polyimine groups.

DETAILED DESCRIPTION OF THE INVENTION

The ink compositions of the present invention generally comprise a water soluble dye and a liquid medium comprising water and at least two other components. Generally, any effective water soluble dye, such as one of the Direct dyes, the Acid dyes, the Basic dyes, the Food dyes, or the like can be selected as the colorant, provided that it is compatible with the other ink components and is soluble in the liquid vehicle. Preferably, the dye exhibits a solubility in water of more than one gram of dye per 100 milliliters of water, more preferably exhibits a solubility in water of at least 2 grams of dye per 100 milliliters of water, and even more preferably a solubility of at least 10 grams of dye per 100 milliliters of water. Examples of suitable dyes includes BASF X-34, Food Black No. 2, Food Red No. 40, Food Blue No. 1, Food Yellow No. 7, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Pylam Certified D&C Red #28 (Acid Red 92), available from Pylam, Direct Brill Pink B Ground Crude, available from Crompton & Knowles, Tartrazine Extra Conc. (FD&C Yellow #5, Acid Yellow 23), available from Sandoz, Carodirect Yellow RL (Direct Yellow 86), available from Carolina Color and Chemical, D&C Yellow #10 (Acid Yellow 3), available from Tricon, Basacid Black X34, available from BASF, Carta Black 2GT, available from Sandoz, Inc., Direct Brilliant Pink B (Crompton-Knolls), the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Co. (Japan), the Duasyn line of "salt-free" dyes available from Hoechst, such as Duasyn Direct Black HEF-SF (Direct Black 168 ), Duasyn Direct Yellow 6G-SF VP216 (Direct Yellow 157), Duasyn Acid Yellow XX-SF VP413 (Acid Yellow 23), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like. Dyes that are invisible to the naked eye but detectable when exposed to radiation outside the visible wavelength range (such as ultraviolet or infrared radiation) are also suitable. The dye is present in the ink composition in any effective amount, generally from about 1 to about 15 percent by weight, and preferably from about 2 to about 7 percent by weight (wherein the amount refers to the amount of dye molecules present in the ink), although the amount can be outside of this range.

The liquid medium generally comprises water, a sulfone component, and a component which is either a cyclic amine or an amide or a mixture of both. Suitable sulfones include those of the general formula

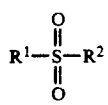

wherein $R^1$ and $R^2$ are independently selected from the group consisting of substituted and unsubstituted aliphatic hydrocarbons (including saturated, monounsaturated, and polyunsaturated, including benzyl and tolyl), preferably with from 1 to about 10 carbon atoms, substituted and unsubstituted aromatic hydrocarbons, preferably with from about 6 to about 12 carbon atoms (including phenyl, benzyl, and tolyl), alcohol moieties, including ethanol and propanol, alkoxy moieties, and polyalkoxy moieties, including polyethylene oxide, polypropylene oxide, and polybutylene oxide, as well as branched alcohol, alkoxy, and polyalkoxy groups. Suitable substituents include alkyl groups, hydroxy groups, alcohol groups, alkoxy groups, polyalkylene oxide groups, sulfone groups, amine groups, amide groups, and the like. Also suitable are cyclic sulfones, including those of the general formula

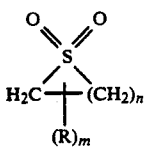

wherein R is an optional substituent, preferably an alkyl, hydroxy, alcohol, or alkoxy substituent, preferably with from 1 to about 12 carbon atoms (such as methyl, ethyl, propyl, —CH$_2$CH$_2$OH, polyalkoxy groups of the formula ([—CH$_2$]$_y$—O)$_x$—[CH$_2$—]$_y$OH, with x being a number of from 0 to about 9 and y being a number of from 1 to about 4, branched alcohol, alkoxy, and polyalkoxy groups, or the like), m is an integer representing the number of substituents, and n is an integer of at least about 2, preferably of at least about 3, and more preferably of from about 3 to about 5, and those of the general formula

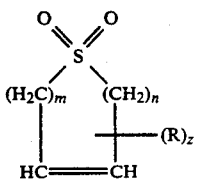

wherein R is an optional substituent, preferably an alkyl, hydroxy, alcohol, alkoxy, or polyalkoxy substituent, preferably with from 1 to about 12 carbon atoms (such as methyl, ethyl, propyl, —(CH$_2$)$_x$OH, with x being a number of from 1 to about 4, polyalkoxy groups of the formula ([—CH$_2$]$_y$—O)$_x$—[CH$_2$—]$_y$OH, with x being a number of from 0 to about 9 and y being a number of from 1 to about 4, branched alcohol, alkoxy, and polyalkoxy groups, or the like), z is an integer representing the number of substituents (multiply substituted species are suitable, such as 2,4-dimethylsulfolane), and m and n are integers independently selected from 0, 1, 2, and 3, wherein the sum of m+n is at least about 1, preferably at least about 2, and more preferably from about 2 to about 4, are also suitable, including cyclic sulfones having two or more double bonds within the ring structure.

Polysulfones are also suitable sulfones for the present invention. Typical polysulfones include those of the formula

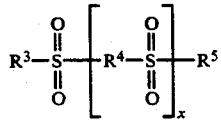

wherein R$^3$, R$^4$, and R$^5$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties, and wherein x is an integer of from 1 to about 4. R$^3$, R$^4$, and R$^5$ can be selected from substituted and unsubstituted aliphatic hydrocarbons (including saturated, monounsaturated, and polyunsaturated, including benzyl and tolyl), preferably with from 1 to about 10 carbon atoms, substituted and unsubstituted aromatic hydrocarbons, preferably with from about 6 to about 12 carbon atoms (including phenyl, benzyl, and tolyl), alcohol moieties, including ethanol and propanol, alkoxy moieties, and polyalkoxy moieties, including polyethylene oxide and polypropylene oxide as well as branched alcohol, alkoxy, and polyalkoxy groups. Suitable substituents include alkyl groups, hydroxy groups, alcohol groups, alkoxy groups, polyalkylene oxide groups, sulfone groups, amine groups, amide groups, and the like.

In addition, cyclic polysulfones are suitable, including those of the formula

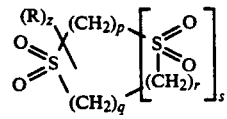

wherein R is an optional substituent, z is an integer representing the number of substituents, and p, q, and r are each integers selected from the group consisting of 0, 1, 2, 3, and 4, wherein the sum of p+q+r is at least about 2, and s is an integer of from 1 to about 4.

Sulfonamides are also suitable as the sulfone component of the present invention. Typical sulfonamides are of the formula $$R-\overset{\overset{O}{\|}}{\underset{\underset{O}{\|}}{S}}-NHR'$$

wherein R and R' are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties.

Examples of suitable sulfones include sulfolane, of the structure

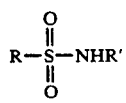

methyl sulfone (also called dimethyl sulfone), of the structure

ethyl sulfone (also called diethyl sulfone), of the structure

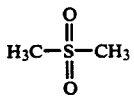

diphenyl sulfone, of the structure

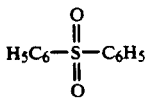

sulfolene, of the structure

methyl ethyl sulfone, of the structure

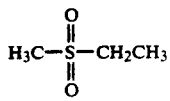

methyl decyl sulfone, of the structure

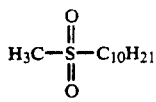

decyl sulfone (also called didecyl sulfone), of the structure

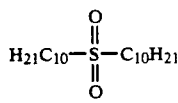

propyl sulfone (also called dipropyl sulfone), of the structure

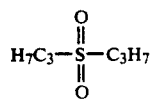

diethanol sulfone, of the formula

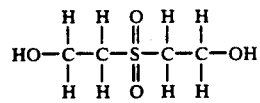

1,2-ethanedisulfone, of the formula

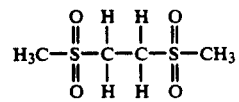

methyl sulfonamide, of the formula

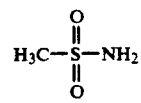

dibutyl sulfone, dipentyl sulfone, dihexyl sulfone, diheptyl sulfone, dioctyl sulfone, dinonyl sulfone, dipolyethylene sulfone, dipolypropylene sulfone, methyl propyl sulfone, methyl butyl sulfone, methyl pentyl sulfone, methyl hexyl sulfone, methyl heptyl sulfone, methyl octyl sulfone, methyl nonyl sulfone, ethyl propyl sulfone, ethyl butyl sulfone, ethyl pentyl sulfone, ethyl hexyl sulfone, ethyl heptyl sulfone, ethyl octyl sulfone, ethyl nonyl sulfone, ethyl decyl sulfone, propyl butyl sulfone, propyl pentyl sulfone, propyl hexyl sulfone, propyl heptyl sulfone, propyl octyl sulfone, propyl nonyl sulfone, propyl decyl sulfone, butyl pentyl sulfone, butyl hexyl sulfone, butyl heptyl sulfone, butyl octyl sulfone, butyl nonyl sulfone, butyl deyl sulfone, pentyl hexyl sulfone, pentyl heptyl sulfone, pentyl octyl sulfone, pentyl nonyl sulfone, pentyl decyl sulfone, hexyl heptyl sulfone, hexyl octyl sulfone, hexyl nonyl sulfone, hexyl decyl sulfone, heptyl octyl sulfone, heptyl nonyl sulfone, heptyl decyl sulfone, octyl nonyl sulfone, octyl decyl sulfone, nonyl decyl sulfone, diphenyl sulfone, methyl phenyl sulfone, ethyl phenyl sulfone, propyl phenyl sulfone, butyl phenyl sulfone, pentyl phenyl sulfone, hexyl phenyl sulfone, heptyl phenyl sulfone, octyl phenyl sulfone, nonyl phenyl sulfone, decyl phenyl sulfone, phenyl benzyl sulfone, dibenzyl sulfone, tolyl benzyl sulfone, ditolyl sulfone, methyl benzyl sulfone, ethyl benzyl sulfone, propyl benzyl sulfone, butyl benzyl sulfone, pentyl benzyl sulfone, hexyl benzyl sulfone, heptyl benzyl sulfone, octyl benzyl sulfone, nonyl benzyl sulfone, decyl benzyl sulfone, methyl tolyl sulfone, ethyl tolyl sulfone, propyl tolyl sulfone, butyl tolyl sulfone, pentyl tolyl sulfone, hexyl tolyl sulfone, heptyl tolyl sulfone, octyl tolyl sulfone, nonyl tolyl sulfone, decyl tolyl sulfone, dipolyoxyethylene sulfone, methyl polyoxyethylene sulfone, ethyl polyoxyethylene sulfone, propyl polyoxyethylene sulfone, butyl polyoxyethylene sulfone, pentyl polyoxyethylene sulfone, hexyl polyoxyethylene sulfone, heptyl polyoxyethylene sulfone, octyl polyoxyethylene sulfone, nonyl polyoxyethylene sulfone, decyl polyoxyethylene sulfone, phenyl polyoxyethylene sulfone, benzyl polyoxyethylene sulfone, tolyl polyoxyethylene sulfone, methyl ethanol sulfone, ethyl ethanol sulfone, propyl ethanol sulfone, butyl ethanol sulfone, pentyl ethanol sulfone, hexyl ethanol sulfone, heptyl ethanol sulfone, octyl ethanol sulfone, nonyl ethanol sulfone, decyl ethanol sulfone, phenyl ethanol sulfone, benzyl ethanol sulfone, tolyl ethanol sulfone, polyoxyethylene ethanol sulfone, dipropanol sulfone, methyl propanol sulfone, ethyl propanol sulfone, propyl propanol sulfone, butyl propanol sulfone, pentyl propanol sulfone, hexyl propanol sulfone, heptyl propanol sulfone, octyl propanol sulfone, nonyl propanol sulfone, decyl propanol sulfone, phenyl propanol sulfone, benzyl propanol sulfone, tolyl propanol sulfone, polyoxyethylene propanol sulfone, ethanol propanol sulfone, dipolyoxypropylene sulfone, methyl polyoxypropylene sulfone, ethyl polyoxypropylene sulfone, propyl polyoxypropylene sulfone, butyl polyoxypropylene sulfone, pentyl polyoxypropylene sulfone, hexyl polyoxypropylene sulfone, heptyl polyoxypropylene sulfone, octyl polyoxypropylene sulfone, nonyl polyoxypropylene sulfone, decyl polyoxypropylene sulfone, phenyl polyoxypropylene sulfone, benzyl polyoxypropylene sulfone, tolyl polyoxypropylene sulfone, ethanol polyoxypropylene sulfone, propanol polyoxypropylene sulfone, polyoxyethylene polyoxypropylene sulfone, and the like, as well as mixtures thereof. The sulfone component is present in the ink in any effective amount, typically from about 1 to about 50 percent by weight, and preferably from about 10 to about 20 percent by weight, although the amount can be outside these ranges.

Suitable cyclic amines include those of the general formula

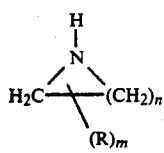

wherein R is an optional substituent, preferably an alkyl, alcohol, hydroxy, or alkoxy substituent, preferably with from 1 to about 12 carbon atoms (such as methyl, ethyl, propyl, —(CH$_2$)$_x$OH, with x being a number of from 1 to about 4, polyalkoxy groups of the formula (—[CH$_2$]$_y$—O)$_x$—[CH$_2$—]$_y$OH, with x being a number of from 0 to about 9 and y being a number of from 1 to about 4, branched polyalkoxy groups, or the like), m is an integer representing the number of substituents, and n is an integer of at least about 3, and preferably from about 3 to about 12. Additional examples of suitable substitutents include sulfone groups, amine groups, amide groups, aryl groups, substituted aryl groups, and the like.

Suitable cyclic amines also include those of the general formula

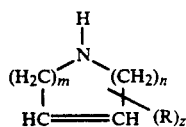

wherein R is an optional substituent, preferably an alkyl, alcohol, hydroxy, or alkoxy substituent, preferably with from 1 to about 12 carbon atoms (such as methyl, ethyl, propyl, —(CH$_2$)$_x$OH, with x being a number of from 1 to about 4, polyalkoxy groups of the formula (—[CH$_2$]$_y$—O)$_x$—[CH$_2$—]$_y$OH, with x being a number of from 0 to about 9 and y being a number of from 1 to about 4, branched polyalkoxy groups, or the like), z is an integer representing the number of substituents, and m and n are integers independently selected from 0, 1, 2, and 3, wherein the sum of m+n is at least about 2, and preferably from about 2 to about 11. Additional examples of suitable substituents include sulfone groups, amine groups, amide groups, aryl groups, substituted aryl groups, and the like. Cyclic amines having two or more double bonds and/or two or more nitrogen atoms within the ring structure are also suitable.

Further examples of suitable cyclic amines include cyclic polyamines, including those of the formula

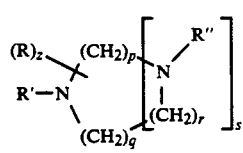

wherein R is an optional substituent, z is an integer representing the number of substituents, p, q, and r are each integers selected from the group consisting of 0, 1, 2, 3, and 4, wherein the sum of p+q+r is at least about 2, s is an integer of from 1 to about 4, and preferably is 1, and R' and R" are independently selected from the group consisting of hydrogen, alkyl, substituted alkyl, aryl, substituted aryl, alcohol, alkoxy, and polyalkoxy, wherein at least one of R' and R" is hydrogen. Additional examples of suitable substitutents include sulfone groups, amine groups, amide groups, aryl groups, substituted aryl groups, and the like.

Additional examples of suitable cyclic amines include cyclic polyamines of the formula

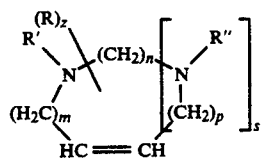

wherein R is an optional substituent, z is an integer representing the number of substituents, m, n, and p are each integers selected from the group consisting of 0, 1, 2, 3, and 4, wherein the sum of m+n+p is at least about 2, s is an integer of from 1 to about 4, and preferably is 1, and R' and R" are independently selected from the group consisting of hydrogen, alkyl, substituted alkyl, aryl, substituted aryl, alcohol, alkoxy, and polyalkoxy, wherein at least one of R' and R" is hydrogen. Cyclic polyamines having two or more double bonds within the ring structure are also suitable. Additional examples of suitable substitutents include sulfone groups, amine groups, amide groups, aryl groups, substituted aryl groups, and the like.

Specific examples of suitable cyclic amines include pyrrolidine, of the structure

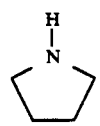

pyrazole, of the structure

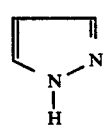

imidazole, of the structure

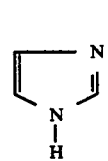

triazoles, of the structures

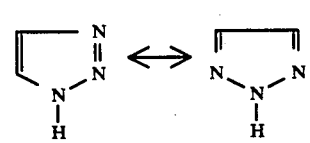

-continued

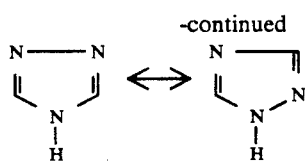

tetrazole, of the structure

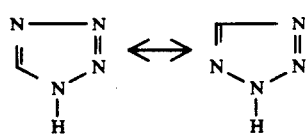

piperazines, of the structures

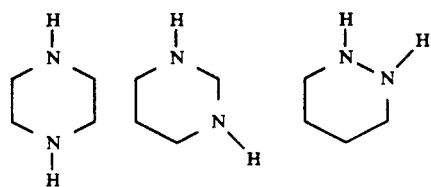

substituted imidazoles, including alkyl and dialkyl substituted imidazoles, such as the methyl substituted imidazoles, ethyl substituted imidazoles, and dimethyl substituted imidazoles, of the structures

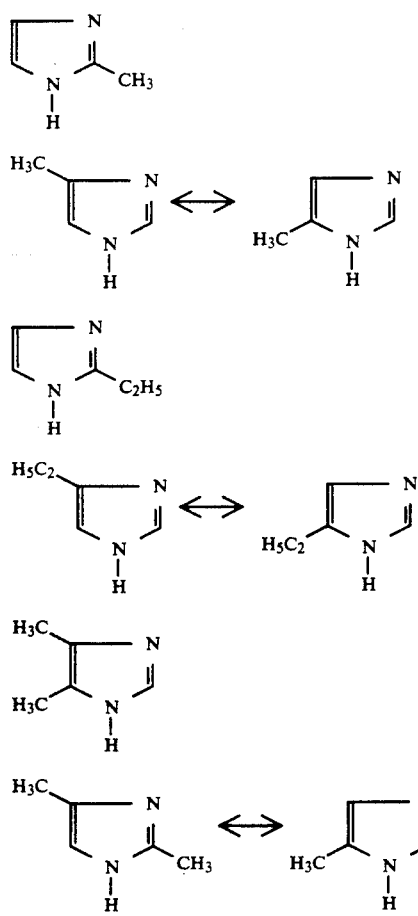

substituted pyrazoles, including alkyl and dialkyl substituted pyrazoles, such as the methyl substituted pyrazoles and dimethyl substituted pyrazoles, of the structures

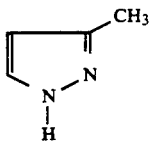

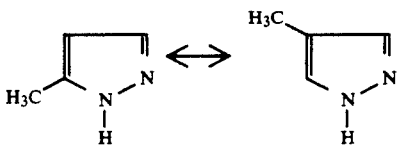

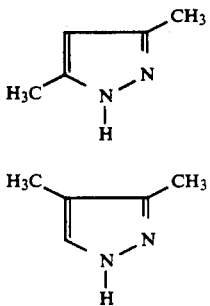

hydroxy ethyl pyrazole, hydroxy ethyl imidazole, hydroxy ethyl piperazine, and polyethylene oxide substituted piperazine, of the structures

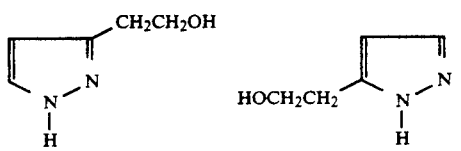

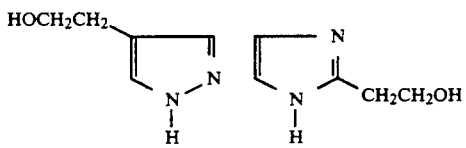

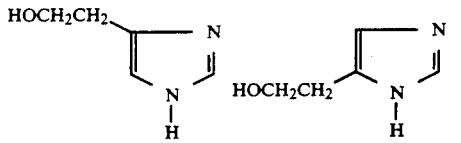

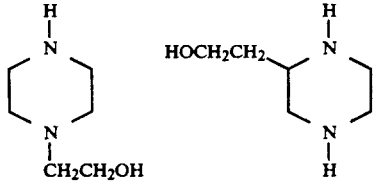

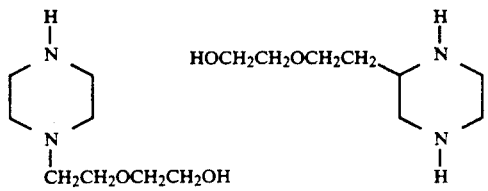

substituted pyrrolidines, such as methyl substituted pyrrolidines, dimethyl substituted pyrrolidines, hydroxyethyl substituted pyrrolidines, polyethylene oxide substituted pyrrolidines, polyalkylene oxide substituted pyrrolidines, polyalkylene oxide substituted imidazoles, polyalkylene oxide substituted pyrazoles, polyalkylene oxide substituted triazoles, polyalkylene oxide substituted tetrazoles, and the like, as well as mixtures thereof.

Suitable cyclic amides include those of the general formula

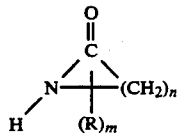

wherein R is an optional substituent, preferably an alkyl, alcohol, or alkoxy substituent, preferably with from 1 to about 12 carbon atoms (such as methyl, ethyl, propyl, —$(CH_2)_xOH$, wherein x is a number of from 1 to about 4, polyalkoxy groups of the formula (—[$CH_2$]$_y$—O)$_x$—[$CH_2$—]$_y$OH, with x being a number of from 0 to about 9 and y being a number of from 1 to about 4, branched alcohol, alkoxy, or polyalkoxy groups, or the like), m is an integer representing the number of substituents, and n is an integer of at least about 3, preferably from about 3 to about 15, and more preferably from about 3 to about 5, including those having one or more double bonds within the ring structure. Additional examples of suitable substitutents include sulfone groups, amine groups, amide groups, aryl groups, substituted aryl groups, and the like.

Additional examples of suitable cyclic amides include those of the formula

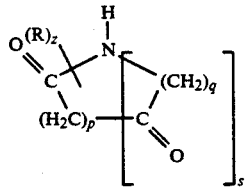

wherein R is an optional substituent, z is an integer representing the number of substituents, p and q are each integers selected from the group consisting of 0, 1, 2, 3, and 4, wherein the sum of p+q is at least about 1, and s is an integer of from 1 to about 4, and preferably is 1. Some specific compounds falling within this structure are also referred to as cyclic imides. Compounds having one or more double bonds within the ring structure are also suitable. Additional examples of suitable substituents include sulfone groups, amine groups, amide groups, aryl groups, substituted aryl groups, and the like.

Further examples of suitable cyclic amides include those of the formula

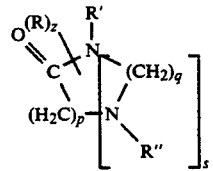

wherein R is an optional substituent, z is an integer representing the number of substituents, p and q are each integers selected from the group consisting of 0, 1, 2, 3, and 4, wherein the sum of p+q is at least about 1, s is an integer of from 1 to about 4, and preferably is 1, and R' and R" are independently selected from the group consisting of hydrogen, alkyl, substituted alkyl, aryl, substituted aryl, alcohol, alkoxy, and polyalkoxy, wherein at least one of R' and R" is hydrogen. Compounds having one or more double bonds within the ring structure are also suitable. Additional examples of suitable substitutents include sulfone groups, amine groups, amide groups, aryl groups, substituted aryl groups, and the like.

Additional examples of suitable cyclic amides include cyclic polyamides. Typical cyclic polyamides include those of the formulas

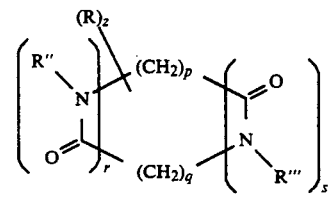

and

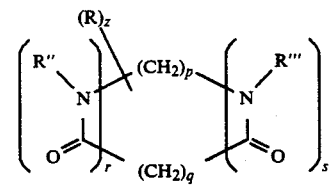

wherein R is an optional substituent, z is an integer representing the number of substituents, p and q are each integers selected from the group consisting of 0, 1, 2, 3, and 4, r and s are each integers of from 1 to about 4, and preferably is 1, and R" and R''' are independently selected from the group consisting of hydrogen, alkyl, substituted alkyl, aryl, substituted aryl, alcohol, alkoxy, and polyalkoxy, wherein at least one of R" and R''' is hydrogen. Additional examples of suitable substituents include sulfone groups, amine groups, amide groups, aryl groups, substituted aryl groups, and the like.

Specific examples of suitable cyclic amides include 2-pyrrolidone, of the structure

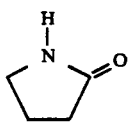

2-piperidone (also called valerolactam), of the structure caprolactam, of the structure

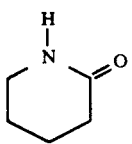

2-azacyclooctanone, of the structure

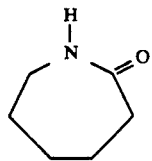

2-azacyclononanone, of a structure similar to 2-azacyclooctanone except that it is a nine-membered ring instead of an eight-membered ring, tetrahydropyrimidone (also called propylene urea), of the structure

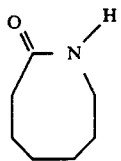

2-imidazolidone, of the structure

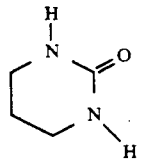

succinimide, of the structure

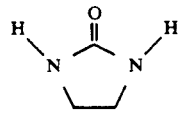

phthalimide, of the structure

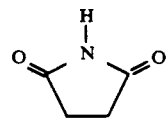

dimethyl hydantoin, of the structure

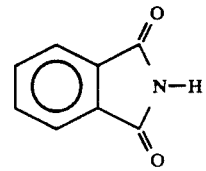

as well as polymers based on dimethyl hydantoin, and the like, as well as substituted 2-pyrrolidones, substituted valerolactams, substituted caprolactams, substituted 2-azacyclooctanones, substituted 2-azacyclononanones, substituted tetrahydropyrimidones, substituted 2-imidazolidones, substituted succinimides, substituted phthalimides, substituted dimethyl hydantoins, and the like.

Also suitable for the present invention are diamides having at least one hydrogen atom bonded to a nitrogen atom. Suitable diamides include those of the formula

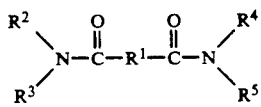

wherein $R^1$ is selected from the group consisting of alkylene groups, substituted alkylene groups (including saturated, monounsaturated, and polyunsaturated, including benzyl and tolyl), preferably with from 1 to about 10 carbon atoms, arylene groups, substituted arylene groups (including phenyl, benzyl, and tolyl), preferably with from about 6 to about 12 carbon atoms, alcohol moieties, including ethanol and propanol, alkoxy moieties, polyalkoxy moieties, including polyethylene oxide and polypropylene oxide as well as branched polyalkoxy groups, and the like, as well as mixtures thereif, wherein $R^2$, $R^3$, $R^4$, and $R^5$ are independently selected from the group consisting of hydrogen, alkyl groups, substituted alkyl groups (including saturated, monounsaturated, and polyunsaturated, including benzyl and tolyl), preferably with from 1 to about 10 carbon atoms, aryl groups, substituted aryl groups (including phenyl, benzyl, and tolyl), preferably with from about 6 to about 12 carbon atoms, alcohol moieties, including ethanol and propanol, alkoxy moieties, polyalkoxy moieties, including polyethylene oxide and polypropylene oxide as well as branched polyalkoxy groups, and the like, as well as mixtures thereof, and wherein at least one of $R^2$, $R^3$, $R^4$, and $R^5$ is a hydrogen atom. Suitable substituents include alkyl groups, hydroxy groups, alcohol groups, alkoxy groups, polyalkylene oxide groups, sulfone groups, amine groups, amide groups, and the like. Examples of suitable diamides include malonamide, of the structure

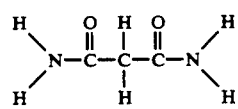

succinamide, of the structure

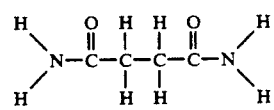

glutaramide, of the structure

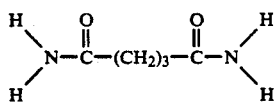

adipamide, of the structure

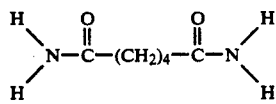

and the like.

Also suitable are amides of the formula

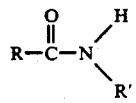

wherein R is a hydrogen atom or an alkyl group and R' is selected from the group consisting of alkoxy groups, polyalkoxy groups, imine groups, and polyimine groups. Examples of alkoxy groups and polyalkoxy groups include those of the following formulas:

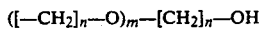

wherein n is an integer of from 1 to about 4 and m is an integer of from 0 to about 9;

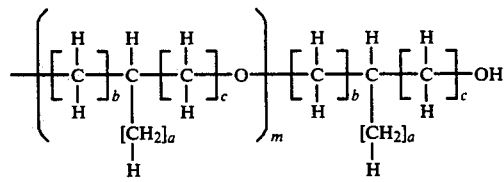

wherein a is an integer of from 1 to about 4, b and c are each integers of from 0 to about 4, wherein the sum of $a+b+c$ is no greater than about 6, and m is an integer of from 0 to about 9;

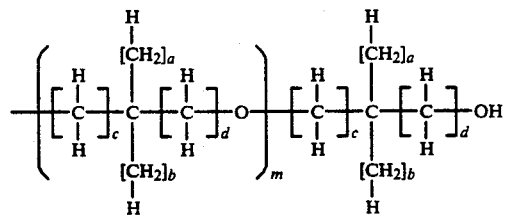

wherein a and b are each integers of from 1 to about 4, c and d are each integers of from 0 to about 4, wherein the sum of $a+b+c+d$ is no greater than about 8, and m is an integer of from 0 to about 9;

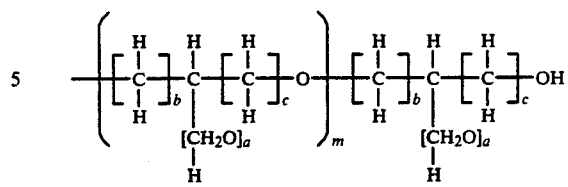

wherein a is an integer of from 1 to about 4, b and c are each integers of from 0 to about 4, wherein the sum of $a+b+c$ is no greater than about 6, and m is an integer of from 0 to about 9;

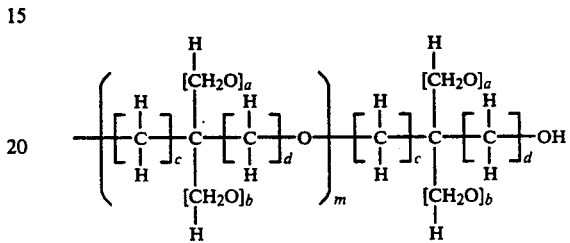

wherein a and b are each integers of from 1 to about 4, c and d are each integers of from 0 to about 4, wherein the sum of $a+b+c+d$ is no greater than about 8, and m is an integer of from 0 to about 9;

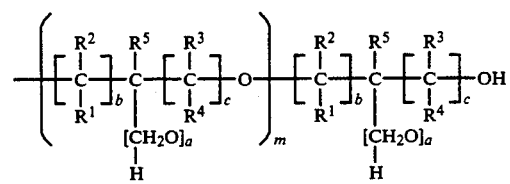

wherein a is an integer of from 1 to about 4, b and c are each integers of from 0 to about 4, wherein the sum of $a+b+c$ is no greater than about 6, m is an integer of from 0 to about 9, and $R^1$, $R^2$, $R^3$, $R^4$, and $R^5$ are independently selected from the group consisting of hydrogen, alkyl groups, preferably with from 1 to about 4 carbon atoms, and substituted alkyl groups, preferably with from 1 to about 4 carbon atoms, wherein the total number of carbon atoms in $R^1+R^2+R^3+R^4+R^5$ from 1 to about 10;

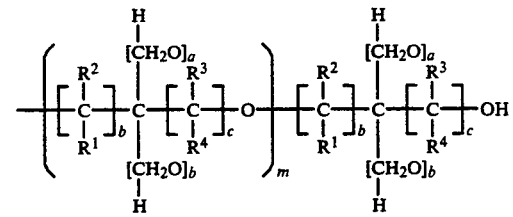

wherein a and b are each integers of from 1 to about 4, c and d are each integers of from 0 to about 4, wherein the sum of $a+b+c+d$ is no greater than about 8, m is an integer of from 0 to about 9, and $R^1$, $R^2$, $R^3$, and $R^4$ are independently selected from the group consisting of hydrogen, alkyl groups, preferably with from 1 to about 4 carbon atoms, and substituted alkyl groups, preferably with from 1 to about 4 carbon atoms, wherein the total number of carbon atoms in $R^1+R^2+R^3+R^4$ is from 1 to about 8; and the like. Specific examples include ethylene oxide groups, polyethylene oxide groups, n-propylene oxide groups, poly n-propylene oxide groups, isopropylene oxide groups, polyisopropylene oxide groups, n-butylene oxide groups, poly n-butylene oxide groups, and the like.

Examples of imine and polyimine groups include those of the following formulas:

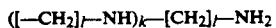

wherein l is an integer of from 1 to about 4 and k is an integer of from 0 to about 9;

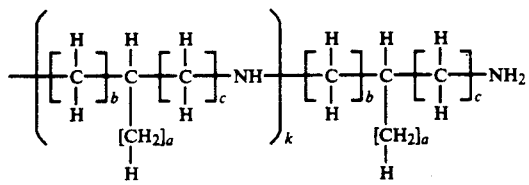

wherein a is an integer of from 1 to about 4, b and c are each integers of from 0 to about 4, wherein the sum of a+b+c is no greater than about 6, and k is an integer of from 0 to about 9;

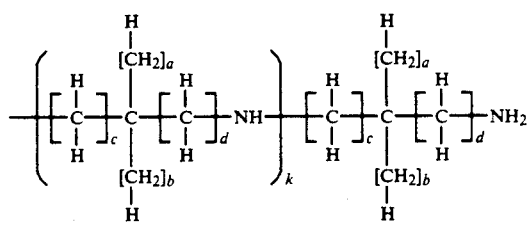

wherein a and b are each integers of from 1 to about 4, c and d are each integers of from 0 to about 4, wherein the sum of a+b+c+d is no greater than about 8, and k is an integer of from 0 to about 9;

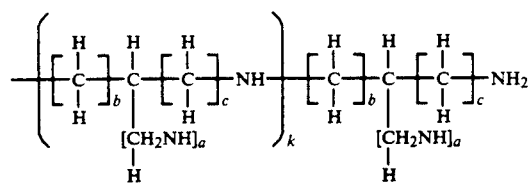

wherein a is an integer of from 1 to about 4, b and c are each integers of from 0 to about 4, wherein the sum of a+b+c is no greater than about 6, and k is an integer of from 0 to about 9;

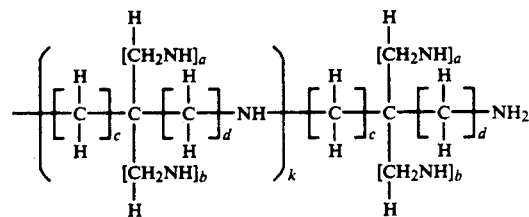

wherein a and b are each integers of from 1 to about 4, c and d are each integers of from 0 to about 4, wherein the sum of a+b+c+d is no greater than about 8, and k is an integer of from 0 to about 9;

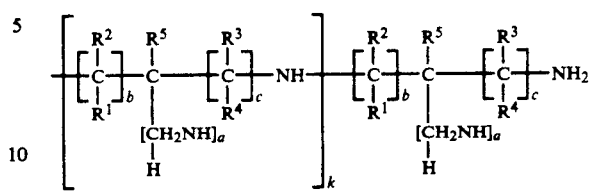

wherein a is an integer of from 1 to about 4, b and c are each integers of from 0 to about 4, wherein the sum of a+b+c is no greater than about 6, k is an integer of from 0 to about 9, and $R^1$, $R^2$, $R^3$, $R^4$, and $R^5$ are independently selected from the group consisting of hydrogen, alkyl groups, preferably with from 1 to about 4 carbon atoms, and substituted alkyl groups, preferably with from 1 to about 4 carbon atoms, wherein the total number of carbon atoms in $R^1+R^2+R^3+R^4+R^5$ is from 1 to about 10;

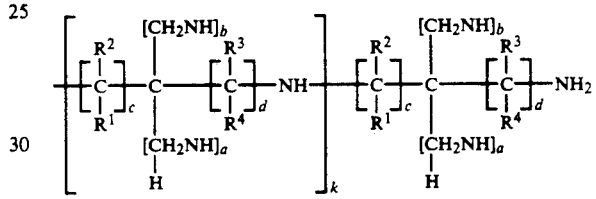

wherein a and b are each integers of from 1 to about 4, c and d are each integers of from 0 to about 4, wherein the sum of a+b+c+d is no greater than about 10, m is an integer of from 0 to about 9, and $R^1$, $R^2$, $R^3$, and $R^4$ are independently selected from the group consisting of hydrogen, alkyl groups, preferably with from 1 to about 4 carbon atoms, and substituted alkyl groups, preferably with from 1 to about 4 carbon atoms, wherein the total number of carbon atoms in $R^1+R^2+R^3+R^4$ is from 1 to about 8;

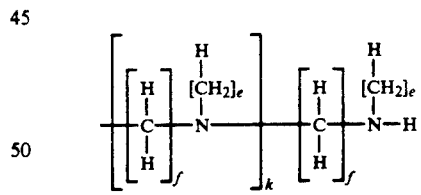

wherein e and f are each integers of from 1 to about 4, the sum of e+f is no greater than about 6, and k is an integer of from 0 to about 9;

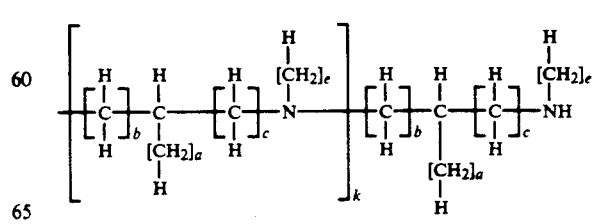

wherein a and e are each integers of from 1 to about 4, b and c are each integers of from 0 to about 4, wherein the sum of a+b+c+e is no greater than about 8, and k is an integer of from 0 to about 9;

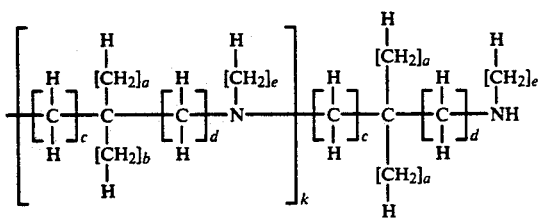

wherein a, b, and e are each integers of from 1 to about 4, c and d are each integers of from 0 to about 4, wherein the sum of a+b+c+d+e is no greater than about 10, and k is an integer of from 0 to about 9;

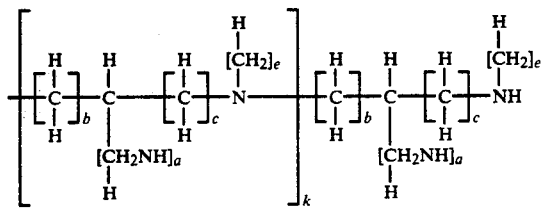

wherein a and e are each integers of from 1 to about 4, b and c are each integers of from 0 to about 4, wherein the sum of a+b+c+e is no greater than about 8, and k is an integer of from 0 to about 9;

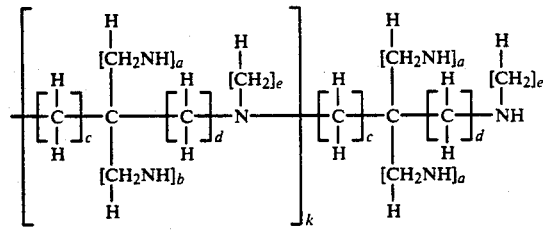

wherein a, b, and e are each integers of from 1 to about 4, c and d are each integers of from 0 to about 4, wherein the sum of a+b+c+d+e is no greater than about 10, and k is an integer of from 0 to about 9;

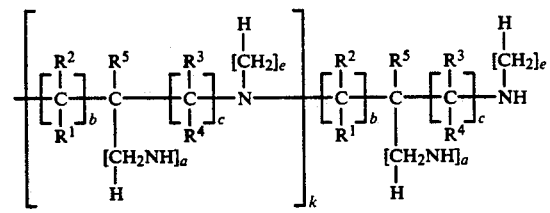

wherein a and e are each integers of from 1 to about 4, b and c are each integers of from 0 to about 4, wherein the sum of a+b+c+e is no greater than about 8, m is an integer of from 0 to about 9, and $R^1$, $R^2$, $R^3$, $R^4$, and $R^5$ are independently selected from the group consisting of hydrogen, alkyl groups, preferably with from 1 to about 4 carbon atoms, and substituted alkyl groups, preferably with from 1 to about 4 carbon atoms, wherein the total number of carbon atoms in $R^1+R^2+R^3+R^4+R^5$ is from 1 to about 10;

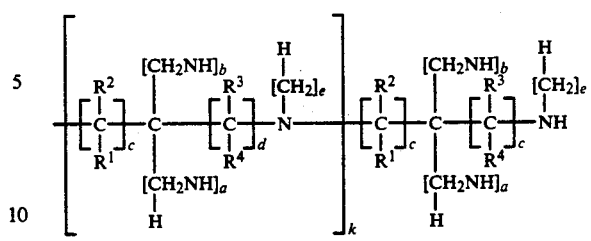

wherein a, b, and e are each integers of from 1 to about 4, c and d are each integers of from 0 to about 4, wherein the sum of a+b+c+d+e is no greater than about 10, m is an integer of from 0 to about 9, and $R^1$, $R^2$, $R^3$, and $R^4$ are independently selected from the group consisting of hydrogen, alkyl groups, preferably with from 1 to about 4 carbon atoms, and substituted alkyl groups, preferably with from 1 to about 4 carbon atoms, wherein the total number of carbon atoms in $R^1+R^2+R^3+R^4$ is from 1 to about 8; and the like.

These amides can also have one or more substituents, such as alkyl groups (typically with from 1 to about 12 carbon atoms), substituted alkyl groups, aryl groups, substituted aryl groups, halogen atoms, sulfate groups, nitro groups, sulfone groups, amine groups, amide groups, acetyl groups, alcohol groups, alkoxy groups, polyalkoxy groups, or the like. Specific examples of suitable amides include formylethanolamine, of the formula

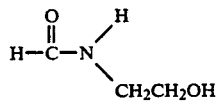

acetylethanolamine, of the formula

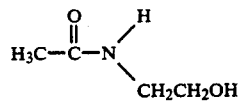

propionyl ethanolamine, of the formula

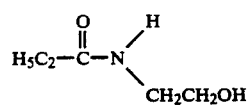

formyl n-propanolamine, of the formula

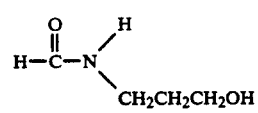

acetyl n-propanolamine, of the formula

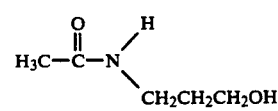

propionyl n-propanolamine, of the formula

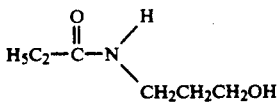

and the like. Compounds of these formulas are known, and are generally commercially available from suppliers such as Aldrich Chemical Company, Milwaukee, Wis. In addition, compounds such as formylethanolamine can be prepared by mixing ethyl formate and monoethanolamine together in approximately a 1 to 1 molar ratio and heating the mixture to about 80° C. to boil off the ethanol generated by the reaction, thus driving the reaction forward, as shown:

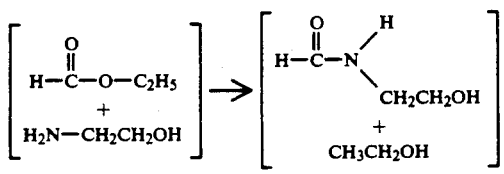

Similar compounds can be prepared from other alkyl formates, such as propyl formate, butyl formate, and the like, and other alkanol amines, such as propanolamine, butanolamine, and the like.

The total amount of cyclic amine and/or amide in the ink is any effective amount, typically from about 1 to about 50 percent by weight, and preferably from about 10 to about 20 percent by weight, although the amount can be outside these ranges.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the ink additive of the present invention to the mixture and mixing at room temperature with moderate shaking until a homogeneous mixture is obtained, typically from about 5 to about 10 minutes. Alternatively, the ink additive of the present invention can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions with the following compositions (percentages are by weight) were prepared by simple mixing of the ingredients at room temperature. The inks were then hand coated onto Xerox ® Series 10 paper with a #7 wire rod and with a ruling pen to form both line images and solid area images. Waterfastness was evaluated on the wire side of the paper by running deionized water over the coated areas and comparing those areas to coated areas which had not been exposed to the water.

1. Sulfolane, 15%; imidazole, 15%; BASF X-34 black dye solution (4% solids), 12%; water, 58%.
2. Sulfolane, 10%; imidazole, 10%; Carta Black 2GT dye, 3.5%; water, 76.5%.
3. Sulfolane, 10%; caprolactam, 10%; Carta Black 2GT dye, 3%; water, 77%.
4. Sulfolane, 10%; pyrazole, 10%; Carta Black 2GT dye, 4%; water, 76%.
5. Sulfolane, 10%; acetyl ethanol amine, 20%; Special Black 7984 dye, 3.5%; water, 66.5%.
6. Sulfolane, 15%; imidazole, 15%; Special Black 7984 dye, 4%; water, 66%; pH adjusted to 8 (from 10) by addition of acetic acid.
7. Sulfolane, 20%; imidazole, 20%; Special Black 7984 dye, 3%; water, 57%.
8. Sulfolane, 10%; dimethyl hydantoin, 10%; Carta Black 2GT dye, 3%; water, 77%.
9. Sulfolane, 10%; methyl pyrazole, 10%; BASF X-34 black dye, 11%; water, 69%.
10. Sulfolane, 10%; dimethyl hydantoin, 10%; dantoin DMHF (a polymer of dimethyl hydantoin), 10%; Carta Black 2GT dye, 3%; water, 67%.
11. Sulfolane, 10%; dimethyl hydantoin, 10%; Special Black 7984 dye, 3%; water, 77%.
12. Sulfolane, 10%; methyl pyrazole, 10%; hexanediol, 10%; Special Black 7984 dye, 10%; water, 60%.
13. Sulfolane, 10%; acetyl ethanol amine, 10%; Carta Black 2GT dye, 5%; water, 75%.
14. Diethanol sulfone, 20%; 2-pyrrolidone, 20%; Carta Black 2GT dye, 3%; water, 57%.
15. Diethanol sulfone, 20%; 2-pyrrolidone, 30%; Carta Black 2GT dye, 3%; water, 47%.
16. Diethanol sulfone, 20%; 2-pyrrolidone, 20%; Carta Black 2GT dye, 4%; water, 56%.
17. 2-Pyrrolidone, 10%; Carta Black 2GT dye, 5%; water, 85%.
18. Sulfolane, 10%; Special Black 7984 dye, 10%; water, 80%.
19. Sulfolane, 10%; BASF X-34 black dye, 11%; water, 79%.
20. Sulfolane, 10%; Carta Black 2GT dye, 3%; water, 87%.

| Ink | Solid Area Optical Density Before Water Treatment | Solid Area Optical Density After Water Treatment | % Waterfastness |
|---|---|---|---|
| 1 | 1.27 | 1.25 | 98 |
| 2 | 1.30 | 1.25 | 96 |
| 3 | 1.37 | 1.31 | 96 |
| 4 | 1.33 | 1.25 | 94 |
| 5 | 1.37 | 1.27 | 93 |
| 6 | 1.34 | 0.98 | 73 |
| 7 | 1.34 | 1.03 | 76 |
| 8 | 1.30 | 1.17 | 90 |
| 9 | 1.11 | 1.10 | 99 |
| 10 | 1.29 | 1.10 | 95 |
| 11 | 1.29 | 0.87 | 67 |
| 12 | 1.35 | 1.29 | 96 |
| 13 | 1.37 | 1.26 | 92 |
| 14 | 1.29 | 1.24 | 96 |
| 15 | 1.31 | 1.29 | 98 |
| 16 | 1.42 | 1.35 | 95 |
| 17 | 1.35 | 1.07 | 79 |
| 18 | 1.46 | 0.70 | 77 |
| 19 | 1.43 | 0.94 | 65 |
| 20 | 1.37 | 1.03 | 75 |

As the above data indicate, inks 1 through 16 generally exhibit superior waterfastness compared to ink 17, which contains no sulfone component and inks 18 through 20, which contain no cyclic amine or cyclic amide component. It is believed that when inks 1 through 16 are incorporated into a thermal ink jet printing apparatus and jetted onto a plain paper substrate to form images, high quality, high resolution, waterfast images will be obtained.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition which comprises water, a water soluble dye, a first component selected from the group consisting of diphenyl sulfone, methyl phenyl sulfone, ethyl phenyl sulfone, propyl phenyl sulfone, butyl phenyl sulfone, pentyl phenyl sulfone, hexyl phenyl sulfone, heptyl phenyl sulfone, octyl phenyl sulfone, nonyl phenyl sulfone, decyl phenyl sulfone, phenyl benzyl sulfone, phenyl polyoxyethylene sulfone, phenyl ethanol sulfone, phenyl propanol sulfone, phenyl polyoxypropylene sulfone, and mixtures thereof, and a second component selected from the group consisting of (a) cyclic amines having at least one hydrogen atom bonded to a nitrogen atom; (b) cyclic amides having at least one hydrogen atom bonded to a nitrogen atom; (c) diamides having at least one hydrogen atom bonded to a nitrogen atom; (d) polyalkoxy-substituted amides having at least one hydrogen atom bonded to a nitrogen atom; (e) polyimine-substituted amides having at least one hydrogen atom bonded to a nitrogen atom; and (f) mixtures thereof, wherein at least one of the first and second components is a solid at 25° C., and wherein the ink is a liquid.

2. An ink composition which comprises water, a water soluble dye, a first component selected from the group consisting of sulfones and mixtures thereof, and a second component which is a cyclic amine, wherein the cyclic amine is selected from the group consisting of (a) cyclic amines of the formula

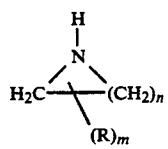

wherein R is an optional substituent, m is an integer representing the number of substituents, and n is an integer of at least about 3; (b) cyclic amines of the formula

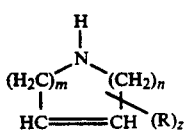

wherein R is an optional substituent, z is an integer representing the number of substituents, and m and n are integers independently selected from 0, 1, 2, and 3, wherein the sum of m+n is at least about 2; (c) cyclic polyamines of the formula

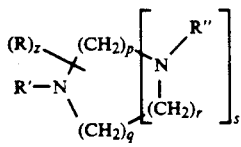

wherein R is an optional substituent, z is an integer representing the number of substituents, p, q, and r are each integers selected from the group consisting of 0, 1, 2, 3, and 4, wherein the sum of p+q+r is at least about 2, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; (d) cyclic polyamines of the formula

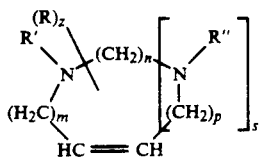

wherein R is an optional substituent, z is an integer representing the number of substituents, m, n, and p are each integers selected from the group consisting of 0, 1, 2, 3, and 4, wherein the sum of m+n+p is at least about 2, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; and (e) mixtures thereof, wherein at least one of the first and second components is a solid at 25° C., and wherein the ink is a liquid.

3. An ink composition which comprises water, a water soluble dye, a first component selected from the group consisting of sulfones and mixtures thereof, and a second component which is a cyclic amine, wherein the cyclic amine is selected from the group consisting of pyrrolidine, substituted pyrrolidines, pyrazole, substituted pyrazoles, imidazole, substituted imidazoles, triazoles, substituted triazoles, tetrazoles, substituted tetrazoles, piperazines, substituted piperazines, and mixtures thereof, wherein at least one of the first and second components is a solid at 25° C., and wherein the ink is a liquid.

4. An ink composition which comprises water, a water soluble dye, a first component selected from the group consisting of sulfones and mixtures thereof, and a second component which is a cyclic amide, wherein the cyclic amide is selected from the group consisting of 2-azacyclooctanone, substituted 2-azacyclooctanones, 2-azacyclononanone, substituted 2-azacyclononanones, and mixtures thereof, wherein at least one of the first and second components is a solid at 25° C., and wherein the ink is a liquid.

5. An ink composition which comprises water, a water soluble dye, a first component selected from the group consisting of sulfones and mixtures thereof, and a second component which is a diamide, wherein the diamide is of the formula

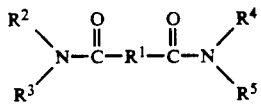

wherein $R^1$ is selected from the group consisting of alkylene groups, substituted alkylene groups, arylene groups, substituted arylene groups, alcohol moieties, alkoxy moieties, polyalkoxy moieties, and mixtures thereif, wherein $R^2$, $R^3$, $R^4$, and $R^5$ are independently selected from the group consisting of hydrogen, alkyl groups, substituted alkyl groups, aryl groups, substituted aryl groups, alcohol moieties, alkoxy moieties, polyalkoxy moieties, and mixtures thereof, and wherein at least one of $R^2$, $R^3$, $R^4$, and $R^5$ is a hydrogen atom, wherein at least one of the first and second components is a solid at 25° C., and wherein the ink is a liquid.

6. An ink composition which comprises water, a water soluble dye, a first component selected from the group consisting of sulfones and mixtures thereof, and a second component which is a diamide, wherein the diamide is selected from the group consisting of malonamide, succinamide, glutaramide, adipamide, and mixtures thereof, wherein at least one of the first and second components is a solid at 25° C., and wherein the ink is a liquid.

7. An ink composition which comprises water, a water soluble dye, a first component selected from the group consisting of sulfones and mixtures thereof, and a second component which is an amide of the formula

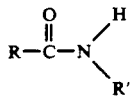

wherein R is a hydrogen atom or an alkyl group and R' is selected from the group consisting of alkoxy groups, polyalkoxy groups, imine groups, and polyimine groups, wherein at least one of the first and second components is a solid at 25° C., and wherein the ink is a liquid.

8. An ink composition which comprises water, a water soluble dye, a first component selected from the group consisting of sulfones and mixtures thereof, and a second component which is an amide of the formula

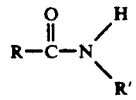

wherein R is a hydrogen atom or an alkyl group and R' is selected from the group consisting of

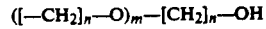

wherein n is an integer of from 1 to about 4 and m is an integer of from 0 to about 9;

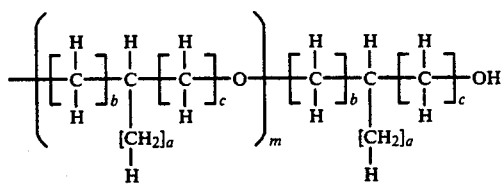

wherein a is an integer of from 1 to about 4, b and c are each integers of from 0 to about 4, wherein the sum of a+b+c is no greater than about 6, and m is an integer of from 0 to about 9;

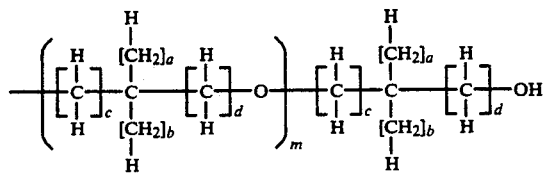

wherein a and b are each integers of from 1 to about 4, c and d are each integers of from 0 to about 4, wherein the sum of a+b+c+d is no greater than about 8, and m is an integer of from 0 to about 9;

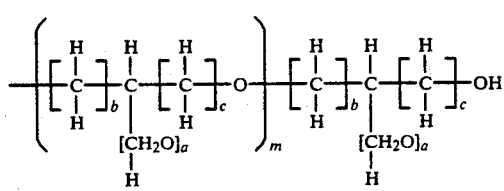

wherein a is an integer of from 1 to about 4, b and c are each integers of from 0 to about 4, wherein the sum of a+b+c is no greater than about 6, and m is an integer of from 0 to about 9;

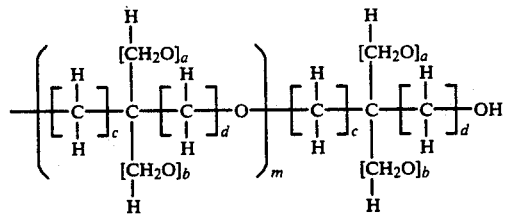

wherein a and b are each integers of from 1 to about 4, c and d are each integers of from 0 to about 4, wherein the sum of a+b+c+d is no greater than about 8, and m is an integer of from 0 to about 9;

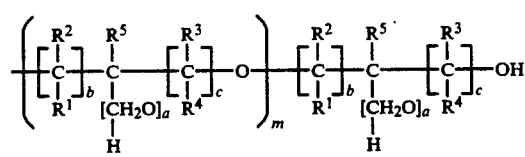

wherein a is an integer of from 1 to about 4, b and c are each integers of from 0 to about 4, wherein the sum of a+b+c is no greater than about 6, m is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10;

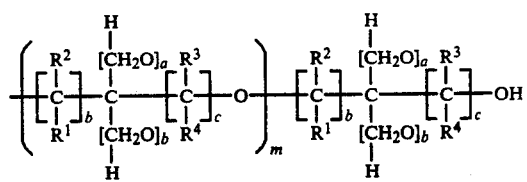

wherein a and b are each integers of from 1 to about 4, c and d are each integers of from 0 to about 4, wherein the sum of a+b+c+d is no greater than about 8, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8;

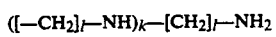

wherein l is an integer of from 1 to about 4 and k is an integer of from 0 to about 9;

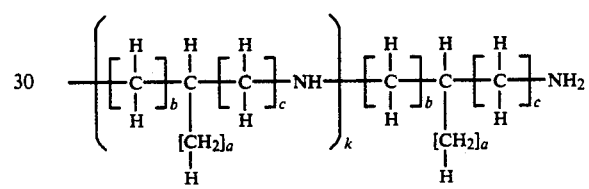

wherein a is an integer of from 1 to about 4, b and c are each integers of from 0 to about 4, wherein the sum of a+b+c is no greater than about 6, and k is an integer of from 0 to about 9;

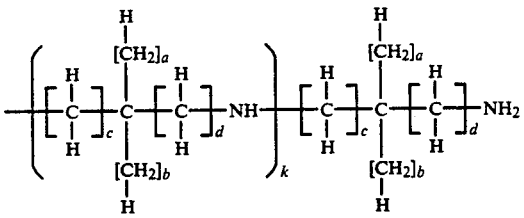

wherein a and b are each integers of from 1 to about 4, c and d are each integers of from 0 to about 4, wherein the sum of a+b+c+d is no greater than about 8, and k is an integer of from 0 to about 9;

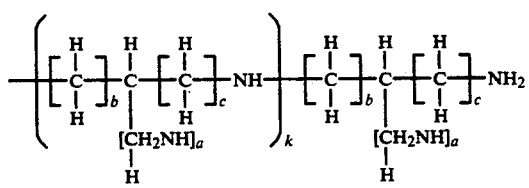

wherein a is an integer of from 1 to about 4, b and c are each integers of from 0 to about 4, wherein the sum of a+b+c is no greater than about 6, and k is an integer of from 0 to about 9;

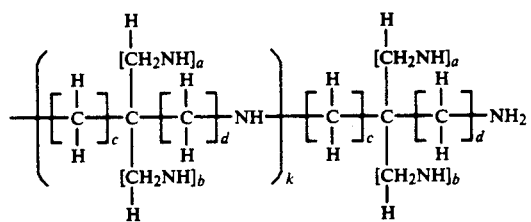

wherein a and b are each integers of from 1 to about 4, c and d are each integers of from 0 to about 4, wherein the sum of a+b+c+d is no greater than about 8, and k is an integer of from 0 to about 9;

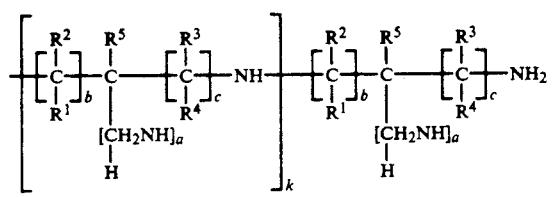

wherein a is an integer of from 1 to about 4, b and c are each integers of from 0 to about 4, wherein the sum of a+b+c is no greater than about 6, k is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10;

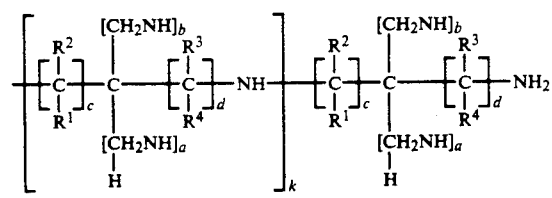

wherein a and b are each integers of from 1 to about 4, c and d are each integers of from 0 to about 4, wherein the sum of a+b+c+d is no greater than about 10, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8;

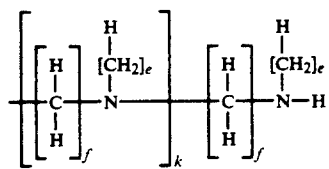

wherein e and f are each integers of from 1 to about 4, the sum of e+f is no greater than about 6, and k is an integer of from 0 to about 9;

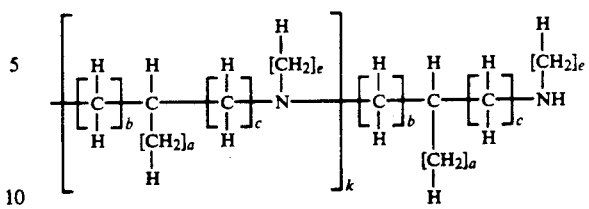

wherein a and e are each integers of from 1 to about 4, b and c are each integers of from 0 to about 4, wherein the sum of a+b+c+e is no greater than about 8, and k is an integer of from 0 to about 9;

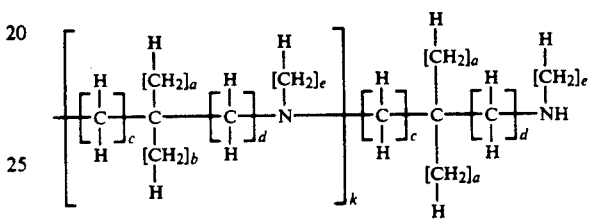

wherein a, b, and e are each integers of from 1 to about 4, c and d are each integers of from 0 to about 4, wherein the sum of a+b+c+d+e is no greater than about 10, and k is an integer of from 0 to about 9;

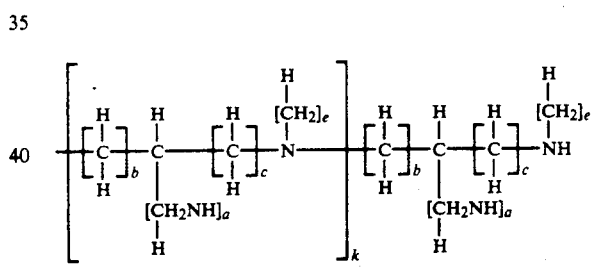

wherein a and e are each integers of from 1 to about 4, b and c are each integers of from 0 to about 4, wherein the sum of a+b+c+e is no greater than about 8, and k is an integer of from 0 to about 9;

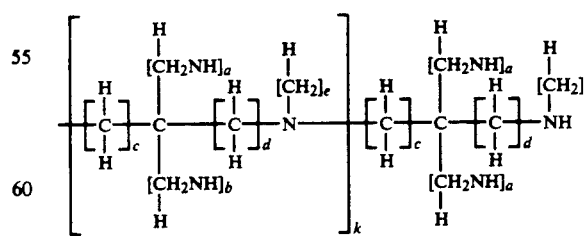

wherein a, b, and e are each integers of from 1 to about 4, c and d are each integers of from 0 to about 4, wherein the sum of a+b+c+d+e is no greater than about 10, and k is an integer of from 0 to about 9;

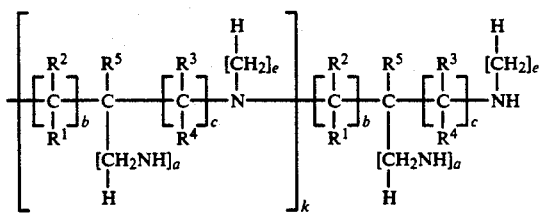

wherein a and e are each integers of from 1 to about 4, b and c are each integers of from 0 to about 4, wherein the sum of a+b+c+e is no greater than about 8, m is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10; and

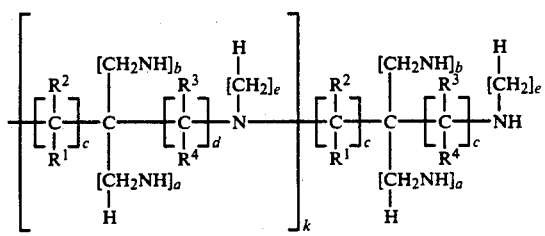

wherein a, b, and e are each integers of from 1 to about 4, c and d are each integers of from 0 to about 4, wherein the sum of a+b+c+d+e is no greater than about 10, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8, wherein at least one of the first and second components is a solid at 25° C., and wherein the ink is a liquid.

9. An ink which comprises water, a water soluble dye, a first component selected from the group consisting of sulfones and mixtures thereof, and a second component selected from the group consisting of formylethanolamine, acetylethanolamine, propionyl ethanolamine, formyl n-propanolamine, acetyl n-propanolamine, propionyl n-propanolamine, and mixtures thereof, wherein at least one of the first and second components is a solid at 25° C., and wherein the ink is a liquid.

10. An ink composition which comprises water, a water soluble dye, a first component selected from the group consisting of (a) sulfones of the formula

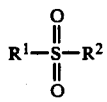

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties, wherein at least one of $R^1$ and $R^2$ is either an aromatic hydrocarbon or a substituted aromatic hydrocarbon; (b) polysulfones; (c) cyclic polysulfones; and (d) mixtures thereof, and a second component selected from the group consisting of (a) cyclic amines having at least one hydrogen atom bonded to a nitrogen atom; (b) cyclic amides having at least one hydrogen atom bonded to a nitrogen atom; (c) diamides having at least one hydrogen atom bonded to a nitrogen atom; (d) amides of the formula

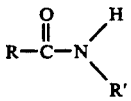

wherein R is a hydrogen atom or an alkyl group and R' is selected from the group consisting of alkoxy groups, polyalkoxy groups, imine groups, and polyimine groups; and (e) mixtures thereof, wherein the ink is a liquid.

11. An ink composition according to claim 10 wherein the dye exhibits a solubility in water of greater than one gram of dye per 100 milliliters of water.

12. An ink composition according to claim 10 wherein the sulfone is present in an amount of from about 1 to about 50 percent by weight of the ink.

13. An ink composition according to claim 10 wherein the sulfone is selected from the group consisting of diphenyl sulfone, methyl phenyl sulfone, ethyl phenyl sulfone, propyl phenyl sulfone, butyl phenyl sulfone, pentyl phenyl sulfone, hexyl phenyl sulfone, heptyl phenyl sulfone, octyl phenyl sulfone, nonyl phenyl sulfone, decyl phenyl sulfone, phenyl benzyl sulfone, phenyl polyoxyethylene sulfone, phenyl ethanol sulfone, phenyl propanol sulfone, phenyl polyoxypropylene sulfone, and mixtures thereof.

14. An ink composition according to claim 10 wherein the cyclic amine, amide, or mixture thereof is present in an amount of from about 1 to about 50 percent by weight of the ink.

15. An ink composition which comprises water, a water soluble dye, a first component selected from the group consisting of (a) sulfones of the formula

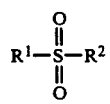

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

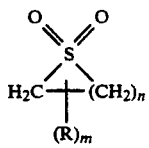

wherein R is an optional substituent, m is an integer representing the number of substituents, and n is an integer of at least about 4; (c) cyclic sulfones of the formula

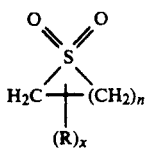

wherein R is a substituent selected from the group consisting of alkyl, hydroxy, alcohol, and alkoxy, x is an integer representing the number of substituents, and n is an integer of at least about 2; (d) cyclic sulfones of the formula

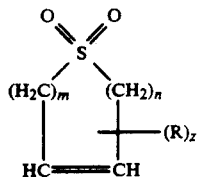

wherein R is an optional substituent, z is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component selected from the group consisting of (a) cyclic amines of the formula

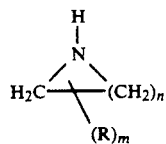

wherein R is an optional substituent, m is an integer representing the number of substituents, and n is an integer of at least about 3; (b) cyclic amines of the formula

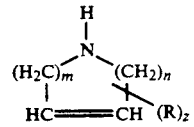

wherein R is an optional substituent, z is an integer representing the number of substituents, and m and n are integers independently selected from 0, 1, 2, and 3, wherein the sum of m+n is at least about 2; (c) cyclic polyamines of the formula

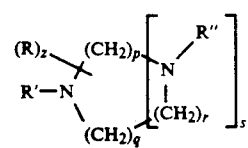

wherein R is an optional substituent, z is an integer representing the number of substituents, p, q, and r are each integers selected from the group consisting of 0, 1, 2, 3, and 4, wherein the sum of p+q+r is at least about 2, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; (d) cyclic polyamines of the formula

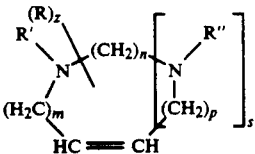

wherein R is an optional substituent, z is an integer representing the number of substituents, m, n, and p are each integers selected from the group consisting of 0, 1, 2, 3, and 4, wherein the sum of m+n+p is at least about 2, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; and (e) mixtures thereof, wherein the ink is a liquid.

16. An ink composition which comprises water, a water soluble dye, a first component selected from the group consisting of (a) sulfones of the formula

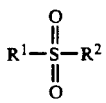

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

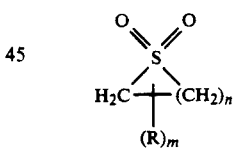

wherein R is an optional substituent, m is an integer representing the number of substituents, and n is an integer of at least about 4; (c) cyclic sulfones of the formula

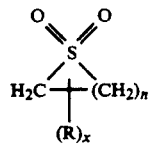

wherein R is a substituent selected from the group consisting of alkyl, hydroxy, alcohol, and alkoxy, x is an integer representing the number of substituents, and n is an integer of at least about 2; (d) cyclic sulfones of the formula

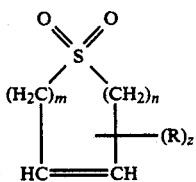

wherein R is an optional substituent, z is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component selected from the group consisting of pyrrolidine, substituted pyrrolidines, pyrazole, substituted pyrazoles, imidazole, substituted imidazoles, triazoles, substituted triazoles, tetrazoles, substituted tetrazoles, piperazines, substituted piperazines, and mixtures thereof, wherein the ink is a liquid.

17. An ink composition according to claim 10 containing a cyclic amide, wherein the cyclic amide is selected from the group consisting of (a) cyclic amides of the formula

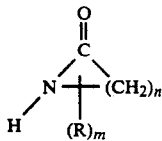

wherein R is an optional substituent, m is an integer representing the number of substituents, and n is an integer of at least about 3; (b) cyclic amides of the formula

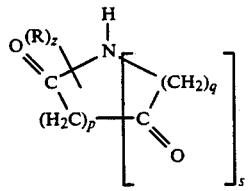

wherein R is an optional substituent, z is an integer representing the number of substituents, p and q are each integers selected from the group consisting of 0, 1, 2, 3, and 4, wherein the sum of p+q is at least about 1, and s is an integer of from 1 to about 4; (c) cyclic amides of the formula

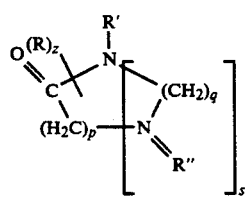

wherein R is an optional substituent, z is an integer representing the number of substituents, p and q are each integers selected from the group consisting of 0, 1, 2, 3, and 4, wherein the sum of p+q is at least about 1, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; (d) cyclic polyamides of the formulas

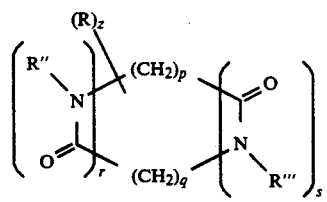

and

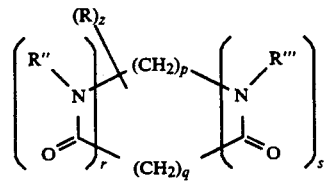

wherein R is an optional substituent, z is an integer representing the number of substituents, p and q are each integers selected from the group consisting of 0, 1, 2, 3, and 4, r and s are each integers of from 1 to about 4, and R" and R'" are independently selected from the group consisting of hydrogen, alkyl, substituted alkyl, aryl, substituted aryl, alcohol, alkoxy, and polyalkoxy, wherein at least one of R" and R'" is hydrogen; and (e) mixtures thereof.

18. An ink composition according to claim 10 containing a cyclic amide, wherein the cyclic amide is selected from the group consisting of valerolactam, substituted valerolactams, caprolactam, substituted caprolactams, 2-azacyclooctanone, substituted 2-azacyclooctanones, 2-azacyclononanone, substituted 2-azacyclononanones, tetrahydropyrimidone, substituted tetrahydropyrimidones, 2-imidazolidone, substituted 2-imidazolidones, succinimide, substituted succinimides, phthalimide, substituted phthalimides, dimethyl hydantoin, substituted dimethyl hydantoins, polymers of dimethyl hydantoin, and mixtures thereof.

19. An ink composition which comprises water, a water soluble dye, a first component selected from the group consisting of (a) sulfones of the formula

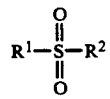

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

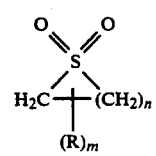

wherein R is an optional substituent, m is an integer representing the number of substituents, and n is an integer of at least about 4; (c) cyclic sulfones of the formula

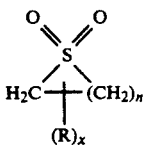

wherein R is a substituent selected from the group consisting of alkyl, hydroxy, alcohol, and alkoxy, x is an integer representing the number of substituents, and n is an integer of at least about 2; (d) cyclic sulfones of the formula

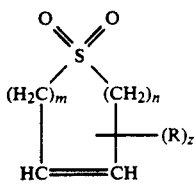

wherein R is an optional substituent, z is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component which is a diamide, wherein the diamide is of the formula

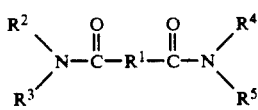

wherein $R^1$ is selected from the group consisting of alkylene groups, substituted alkylene groups, arylene groups, substituted arylene groups, alcohol moieties, alkoxy moieties, polyalkoxy moieties, and mixtures thereif, wherein $R^2$, $R^3$, $R^4$, and $R^5$ are independently selected from the group consisting of hydrogen, alkyl groups, substituted alkyl groups, aryl groups, substituted aryl groups, alcohol moieties, alkoxy moieties, polyalkoxy moieties, and mixtures thereof, and wherein at least one $R^2$, $R^3$, $R^4$, and $R^5$ is a hydrogen atom, wherein the ink is a liquid.

20. An ink composition which comprises water, a water soluble dye, a first component selected from the group consisting of (a) sulfones of the formula

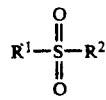

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

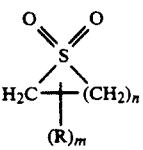

wherein R is an optional substituent, m is an integer representing the number of substituents, and n is an integer of at least about 4; (c) cyclic sulfones of the formula

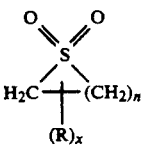

wherein R is a substituent selected from the group consisting of alkyl, hydroxy, alcohol, and alkoxy, x is an integer representing the number of substituents, and n is an integer of at least about 2; (d) cyclic sulfones of the formula

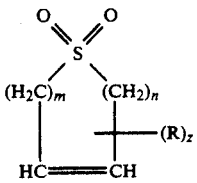

wherein R is an optional substituent, z is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component which is a diamide, wherein the diamide is selected from the group consisting of malonamide, succinamide, glutaramide, adipamide, and mixtures thereof, wherein the ink is a liquid.

21. An ink composition which comprises water, a water soluble dye, a first component selected from the group consisting of (a) sulfones of the formula

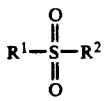

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

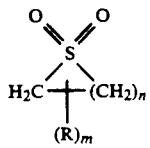

wherein R is an optional substituent, m is an integer representing the number of substituents, and n is an integer of at least about 4; (c) cyclic sulfones of the formula

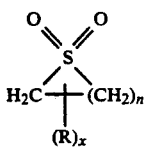

wherein R is a substituent selected from the group consisting of alkyl, hydroxyl, alcohol, and alkoxy, x is an integer representing the number of substituents, and n is an integer of at least about 2; (d) cyclic sulfones of the formula

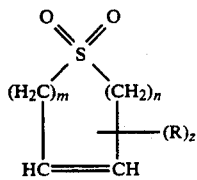

wherein R is an optional substituent, z is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component which is an amide of the formula

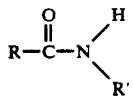

wherein R is a hydrogen atom or an alkyl group and R' is selected from the group consisting of

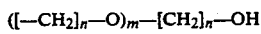

wherein n is an integer of from 1 to about 4 and m is an integer of from 0 to about 9;

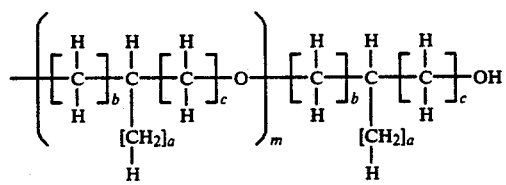

wherein a is an integer of from 1 to about 4, b and c are each integers of from 0 to about 4, wherein the sum of a+b+c is no greater than about 6, and m is an integer of from 0 to about 9;

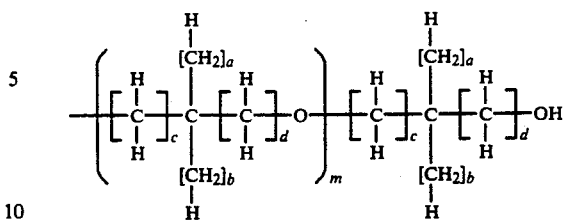

wherein a and b are each integers of from 1 to about 4, c and d are each integers of from 0 to about 4, wherein the sum of a+b+c+d is no greater than about 8, and m is an integer of from 0 to about 9;

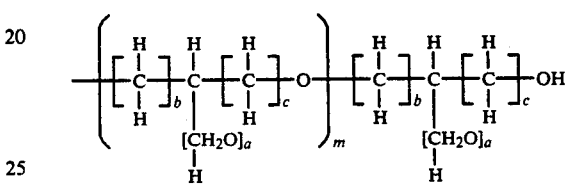

wherein a is an integer of from 1 to about 4, b and c are each integers of from 0 to about 4, wherein the sum of a+b+c is no greater than about 6, and m is an integer of from 0 to about 9;

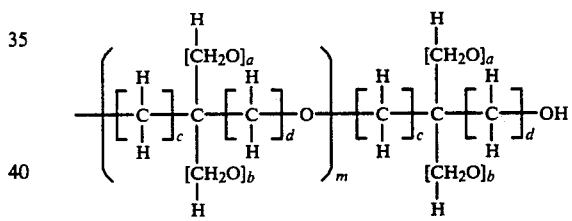

wherein a and b are each integers of from 1 to about 4, c and d are each integers of from 0 to about 4, wherein the sum of a+b+c+d is no greater than about 8, and m is an integer of from 0 to about 9;

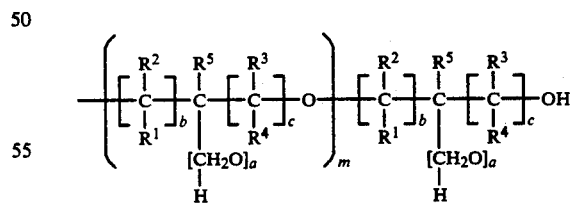

wherein a is an integer of from 1 to about 4, b and c are each integers of from 0 to about 4, wherein the sum of a+b+c is no greater than about 6, m is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10;

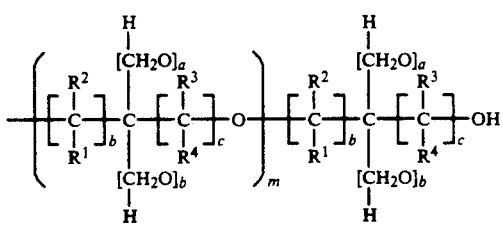

wherein a and b are each integers of from 1 to about 4, c and d are each integers of from 0 to about 4, wherein the sum of a+b+c+d is no greater than about 8, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8;

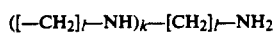

wherein l is an integer of from 1 to about 4 and k is an integer of from 0 to about 9;

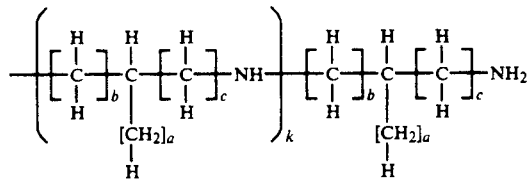

wherein a is an integer of from 1 to about 4, b and c are each integers of from 0 to about 4, wherein the sum of a+b+c is no greater than about 6, and k is an integer of from 0 to about 9;

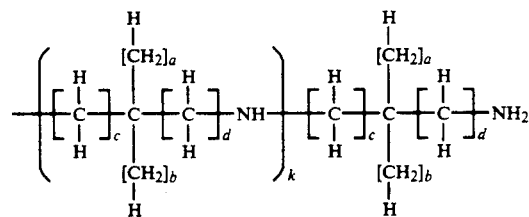

wherein a and b are each integers of from 1 to about 4, c and d are each integers of from 0 to about 4, wherein the sum of a+b+c+d is no greater than about 8, and k is an integer of from 0 to about 9;

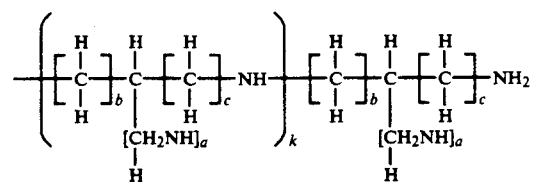

wherein a is an integer of from 1 to about 4, b and c are each integers of from 0 to about 4, wherein the sum of a+b+c is no greater than about 6, and k is an integer of from 0 to about 9;

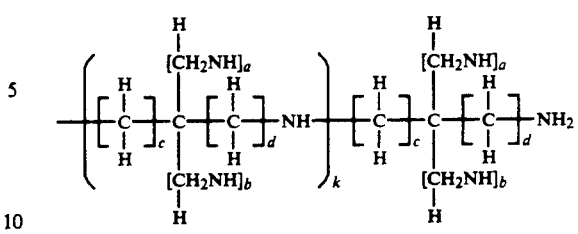

wherein a and b are each integers of from 1 to about 4, c and d are each integers of from 0 to about 4, wherein the sum of a+b+c+d is no greater than about 8, and k is an integer of from 0 to about 9;

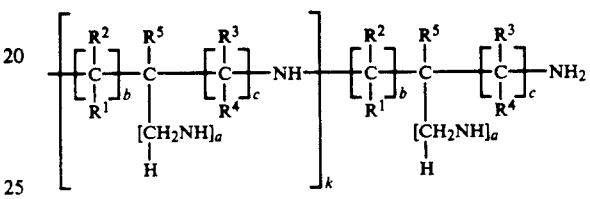

wherein a is an integer of from 1 to about 4, b and c are each integers of from 0 to about 4, wherein the sum of a+b+c is no greater than about 6, k is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10;

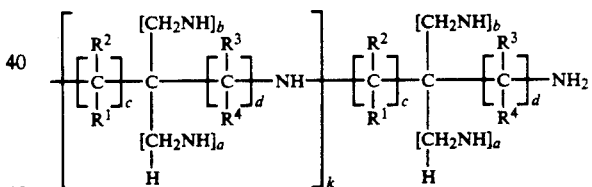

wherein a and b are each integers of from 1 to about 4, c and d are each integers of from 0 to about 4, wherein the sum of a+b+c+d is no greater than about 10, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8;

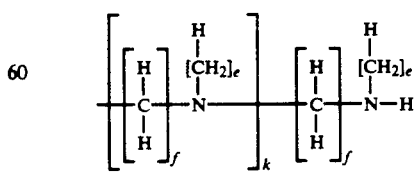

wherein e and f are each integers of from 1 to about 4, the sum of e+f is no greater than about 6, and k is an integer of from 0 to about 9;

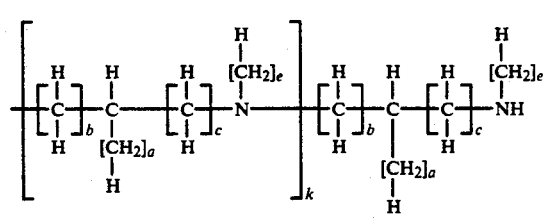

wherein a and e are each integers of from 1 to about 4, b and c are each integers of from 0 to about 4, wherein the sum of a+b+c+e is no greater than about 8, and k is an integer of from 0 to about 9;

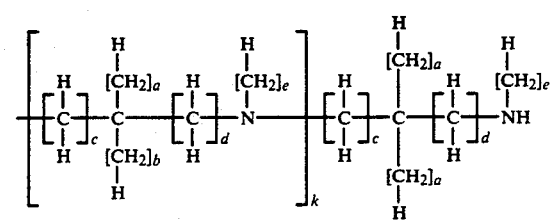

wherein a, b, and e are each integers of from 1 to about 4, c and d are each integers of from 0 to about 4, wherein the sum of a+b+c+d+e is no greater than about 10, and k is an integer of from 0 to about 9;

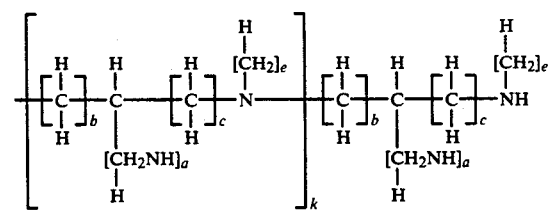

wherein a and e are each integers of from 1 to about 4, b and c are each integers of from 0 to about 4, wherein the sum of a+b+c+e is no greater than about 8, and k is an integer of from 0 to about 9;

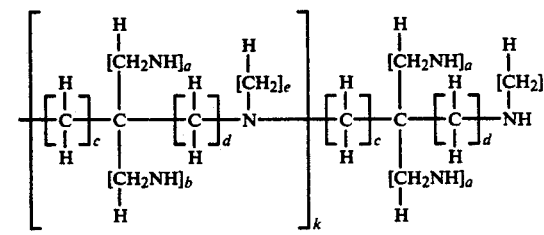

wherein a, b, and e are each integers of from 1 to about 4, c and d are each integers of from 0 to about 4, wherein the sum of a+b+c+d+e is no greater than about 10, and k is an integer of from 0 to about 9;

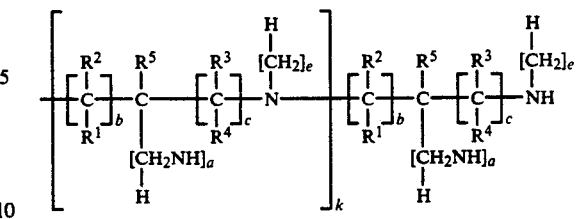

wherein a and e are each integers of from 1 to about 4, b and c are each integers of from 0 to about 4, wherein the sum of a+b+c+e is no greater than about 8, m is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10; and

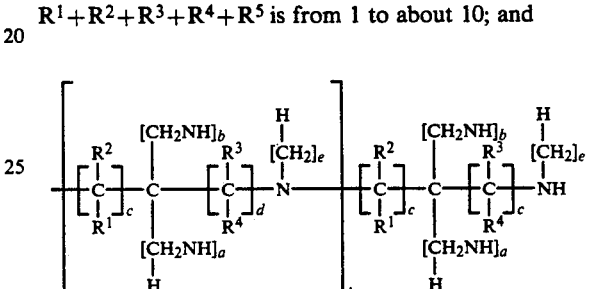

wherein a, b, and e are each integers of from 1 to about 4, c and d are each integers of from 0 to about 4, wherein the sum of a+b+c+d+e is no greater than about 10, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8, wherein the ink is a liquid.

22. An ink composition which comprises water, a water soluble dye, a first component selected from the group consisting of (a) sulfones of the formula

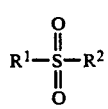

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

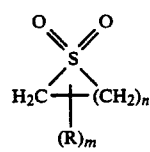

wherein R is an optional substituent, m is an integer representing the number of substituents, and n is an integer of at least about 4; (c) cyclic sulfones of the formula

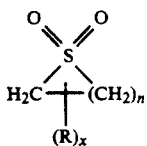

wherein R is a substituent selected from the group consisting of alkyl, hydroxy, alcohol, and alkoxy, x is an integer representing the number of substituents, and n is an integer of at least about 2; (d) cyclic sulfones of the formula

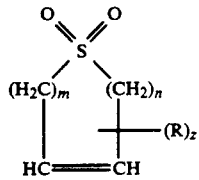

wherein R is an optional substituent, z is an integer representing the number of substituents, and m and n are integers independently selected from 0, 1, 2, and 3, wherein the sum of m+n is at least about 1; (e) polysulfones; (f) cyclic polysulfones; (g) sulfonamides; and (h) mixtures thereof, and a second component which is a material selected from the group consisting of formylethanolamine, acetylethanolamine, propionyl ethanolamine, formyl n-propanolamine, acetyl n-propanolamine, propionyl n-propanolamine, and mixtures thereof, wherein the ink is a liquid.

23. An ink composition which comprises water, a water soluble dye, a first component selected from the group consisting of sulfones and mixtures thereof, and a second component selected from the group consisting of (a) cyclic amines; (b) cyclic polyamines; (c) cyclic polyamides; (d) diamides having at least one hydrogen atom bonded to a nitrogen atom; (e) amides of the formula

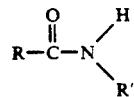

wherein R is a hydrogen atom or an alkyl group and R' is selected from the group consisting of alkoxy groups, polyalkoxy groups, imine groups, and polyimine groups; and (f) mixtures thereof, wherein the ink is a liquid.

24. An ink composition according to claim 23 wherein the dye exhibits a solubility in water of greater than one gram of dye per 100 milliliters of water.

25. An ink composition according to claim 23 wherein the sulfone is present in an amount of from about 1 to about 50 percent by weight of the ink.

26. An ink composition according to claim 23 wherein the sulfone is selected from the group consisting of (a) sulfones of the formula

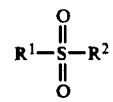

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

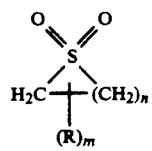

wherein R is an optional substituent, m is an integer representing the number of substituents, and n is an integer of at least about 2; (c) cyclic sulfones of the formula

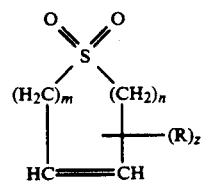

wherein R is an optional substituent, z is an integer representing the number of substituents, and m and n are integers independently selected from 0, 1, 2, and 3, wherein the sum of m+n is at least about 1; (d) polysulfones; (e) cyclic polysulfones; (f) sulfonamides; and (g) mixtures thereof.

27. An ink composition according to claim 23 wherein the sulfone is selected from the group consisting of dimethyl sulfone, diethyl sulfone, dipropyl sulfone, dibutyl sulfone, dipentyl sulfone, dihexyl sulfone, diheptyl sulfone, dioctyl sulfone, dinonyl sulfone, didecyl sulfone, methyl ethyl sulfone, methyl propyl sulfone, methyl butyl sulfone, methyl pentyl sulfone, methyl hexyl sulfone, methyl heptyl sulfone, methyl octyl sulfone, methyl nonyl sulfone, methyl decyl sulfone, ethyl propyl sulfone, ethyl butyl sulfone, ethyl pentyl sulfone, ethyl hexyl sulfone, ethyl heptyl sulfone, ethyl octyl sulfone, ethyl nonyl sulfone, ethyl decyl sulfone, propyl butyl sulfone, propyl pentyl sulfone, propyl hexyl sulfone, propyl heptyl sulfone, propyl octyl sulfone, propyl nonyl sulfone, propyl decyl sulfone, butyl pentyl sulfone, butyl hexyl sulfone, butyl heptyl sulfone, butyl octyl sulfone, butyl nonyl sulfone, butyl decyl sulfone, pentyl hexyl sulfone, pentyl heptyl sulfone, pentyl octyl sulfone, pentyl nonyl sulfone, pentyl decyl sulfone, hexyl heptyl sulfone, hexyl octyl sulfone, hexyl nonyl sulfone, hexyl decyl sulfone, heptyl octyl sulfone, heptyl nonyl sulfone, heptyl decyl sulfone, octyl nonyl sulfone, octyl decyl sulfone, nonyl decyl sulfone, diphenyl sulfone, methyl phenyl sulfone, ethyl phenyl sulfone, propyl phenyl sulfone, butyl phenyl sulfone, pentyl phenyl sulfone, hexyl phenyl sulfone, heptyl phenyl sulfone, octyl phenyl sulfone, nonyl phenyl sulfone, decyl phenyl sulfone, phenyl benzyl sulfone, dibenzyl sulfone, tolyl benzyl sulfone, ditolyl sulfone, methyl benzyl sulfone, ethyl benzyl sulfone, propyl benzyl sulfone, butyl benzyl sulfone, pentyl benzyl sulfone, hexyl benzyl sulfone, heptyl benzyl sulfone, octyl benzyl sulfone, nonyl benzyl sulfone, decyl benzyl sulfone, methyl tolyl sulfone, ethyl tolyl sulfone, propyl tolyl sulfone, butyl tolyl sulfone, pentyl tolyl sulfone, hexyl tolyl sulfone, heptyl tolyl sulfone, octyl tolyl sulfone, nonyl tolyl sulfone, decyl tolyl sulfone, dipolyoxyethylene sulfone, methyl polyoxyethylene sulfone, ethyl polyoxyethylene sulfone, propyl polyoxyethylene sulfone, butyl polyoxyethylene sulfone, pentyl polyoxyethylene sulfone, hexyl polyoxyethylene sulfone, heptyl polyoxyethylene sulfone, octyl polyoxyethylene sulfone, nonyl polyoxyethylene sulfone, decyl polyoxyethylene sulfone, phenyl polyoxyethylene sulfone, benzyl polyoxyethylene sulfone, tolyl polyoxyethylene sulfone, diethanol sulfone, methyl ethanol sulfone, ethyl ethanol sulfone, propyl ethanol sulfone, butyl ethanol sulfone, pentyl ethanol sulfone, hexyl ethanol sulfone, heptyl ethanol sulfone, octyl ethanol sulfone, nonyl ethanol sulfone, decyl ethanol sulfone, phenyl ethanol sulfone, benzyl ethanol sulfone, tolyl ethanol sulfone, polyoxyethylene ethanol sulfone, dipropanol sulfone, methyl propanol sulfone, ethyl propanol sulfone, propyl propanol sulfone, butyl propanol sulfone, pentyl propanol sulfone, hexyl propanol sulfone, heptyl propanol sulfone, octyl propanol sulfone, nonyl propanol sulfone, decyl propanol sulfone, phenyl propanol sulfone, benzyl propanol sulfone, tolyl propanol sulfone, polyoxyethylene propanol sulfone, ethanol propanol sulfone, dipolyoxypropylene sulfone, methyl polyoxypropylene sulfone, ethyl polyoxypropylene sulfone, propyl polyoxypropylene sulfone, butyl polyoxypropylene sulfone, pentyl polyoxypropylene sulfone, hexyl polyoxypropylene sulfone, heptyl polyoxypropylene sulfone, octyl polyoxypropylene sulfone, nonyl polyoxypropylene sulfone, decyl polyoxypropylene sulfone, phenyl polyoxypropylene sulfone, benzyl polyoxypropylene sulfone, tolyl polyoxypropylene sulfone, ethanol polyoxypropylene sulfone, propanol polyoxypropylene sulfone, polyoxyethylene polyoxypropylene sulfone, sulfolene, 1,2-ethanedisulfone, methyl sulfonamide, and mixtures thereof.

28. An ink composition according to claim 23 wherein the cyclic amine, amide, or mixture thereof is present in an amount of from about 1 to about 50 percent by weight of the ink.

29. An ink composition which comprises water, a water soluble dye, a first component selected from the group consisting of sulfones and mixtures thereof, and a second component selected from the group consisting of (a) cyclic amines of the formula

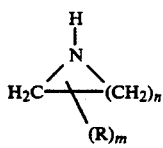

wherein R is an optional substituent, m is an integer representing the number of substituents, and n is an integer of at least about 3; (b) cyclic amines of the formula

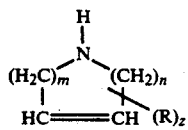

wherein R is an optional substituent, z is an integer representing the number of substituents, and m and n are integers independently selected from 0, 1, 2, and 3, wherein the sum of m+n is at least about 2; (c) cyclic polyamines of the formula

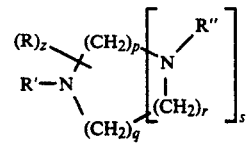

wherein R is an optional substituent, z is an integer representing the number of substituents, p, q, and r are each integers selected from the group consisting of 0, 1, 2, 3, and 4, wherein the sum of p+q+r is at least about 2, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; (d) cyclic polyamines of the formula

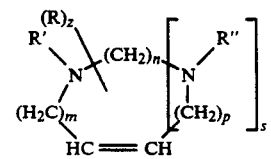

wherein R is an optional substituent, z is an integer representing the number of substituents, m, n, and p are each integers selected from the group consisting of 0, 1, 2, 3, and 4, wherein the sum of m+n+p is at least about 2, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; and (e) mixtures thereof, wherein the ink is a liquid.

30. An ink composition which comprises water, a water soluble dye, a first component selected from the group consisting of sulfones and mixtures thereof, and a second component selected from the group consisting of pyrrolidine, substituted pyrrolidines, pyrazole, substituted pyrazoles, imidazole, substituted imidazoles, triazoles, substituted triazoles, tetrazoles, substituted tetrazoles, piperazines, substituted piperazines, and mixtures thereof, wherein the ink is a liquid.

31. An ink composition which comprises water, a water soluble dye, a first component selected from the group consisting of sulfones and mixtures thereof, and a second component selected from the group consisting of 2-azacyclooctanone, substituted 2-azacyclooctanones, 2-azacyclononanone, substituted 2-azacyclononanones, and mixtures thereof, wherein the ink is a liquid.

32. An ink composition which comprises water, a water soluble dye, a first component selected from the group consisting of sulfones and mixtures thereof, and a second component which is a diamide, wherein the diamide is of the formula

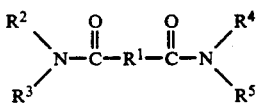

wherein R¹ is selected from the group consisting of alkylene groups, substituted alkylene groups, arylene groups, substituted arylene groups, alcohol moieties, alkoxy moieties, polyalkoxy moieties, and mixtures thereif, wherein R², R³, R⁴, and R⁵ are independently selected from the group consisting of hydrogen, alkyl groups, substituted alkyl groups, aryl groups, substituted aryl groups, alcohol moieties, alkoxy moieties, polyalkoxy moieties, and mixtures thereof, and wherein at least one of R², R³, R⁴, and R⁵ is a hydrogen atom, wherein the ink is a liquid.

33. An ink composition which comprises water, a water soluble dye, a first component selected from the group consisting of sulfones and mixtures thereof, and a second component which is a diamide, wherein the diamide is selected from the group consisting of malonamide, succinamide, glutaramide, adipamide, and mixtures thereof, wherein the ink is a liquid.

34. An ink composition which comprises water, a water soluble dye, a first component selected from the group consisting of sulfones and mixtures thereof, and a second component which is an amide of the formula

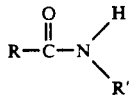

wherein R is a hydrogen atom or an alkyl group and R' is selected from the group consisting of

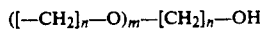

wherein n is an integer of from 1 to about 4 and m is an integer of from 0 to about 9;

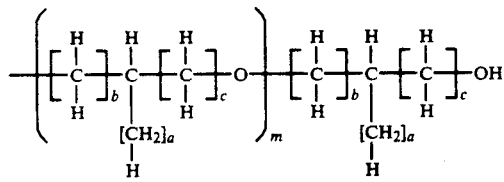

wherein a is an integer of from 1 to about 4, b and c are each integers of from 0 to about 4, wherein the sum of a+b+c is no greater than about 6, and m is an integer of from 0 to about 9;

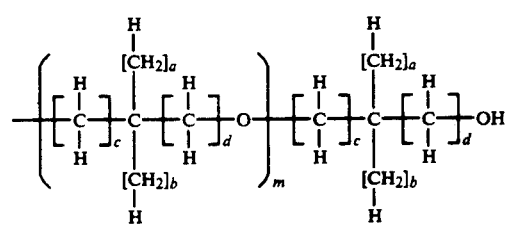

wherein a and b are each integers of from 1 to about 4, c and d are each integers of from 0 to about 4, wherein the sum of a+b+c+d is no greater than about 8, and m is an integer of from 0 to about 9;

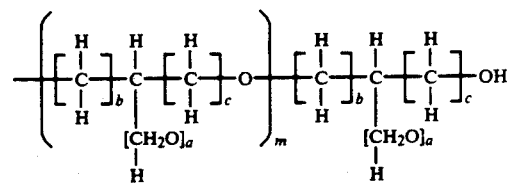

wherein a is an integer of from 1 to about 4, b and c are each integers of from 0 to about 4, wherein the sum of a+b+c is no greater than about 6, and m is an integer of from 0 to about 9;

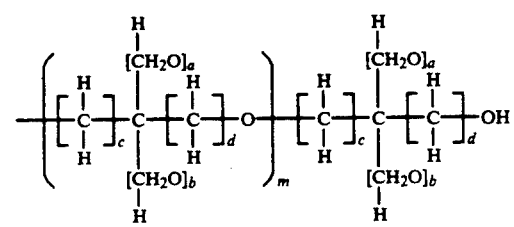

wherein a and b are each integers of from 1 to about 4, c and d are each integers of from 0 to about 4, wherein the sum of a+b+c+d is no greater than about 8, and m is an integer of from 0 to about 9;

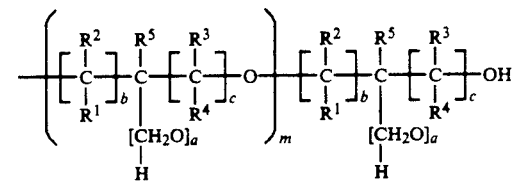

wherein a is an integer of from 1 to about 4, b and c are each integers of from 0 to about 4, wherein the sum of a+b+c is no greater than about 6, m is an integer of from 0 to about 9, and R¹, R², R³, R⁴, and R⁵ are independently selected from the group consisting of hydrogen, alkyl groups, and substituted alkyl groups, wherein the total number of carbon atoms in R¹+R²+R³+R⁴+R⁵ is from 1 to about 10;

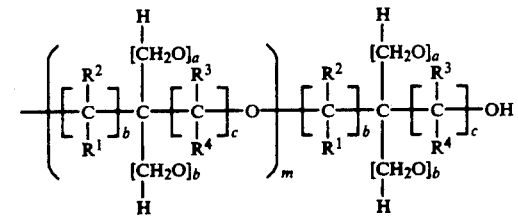

wherein a and b are each integers of from 1 to about 4, c and d are each integers of from 0 to about 4, wherein the sum of a+b+c+d is no greater than about 8, m is an integer of from 0 to about 9, and R¹, R², R³, and R⁴ are independently selected from the group consisting of hydrogen, alkyl groups, and substituted alkyl groups, wherein the total number of carbon atoms in R¹+R²+R³+R⁴ is from 1 to about 8;

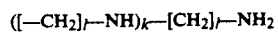

wherein l is an integer of from 1 to about 4 and k is an integer of from 0 to about 9;

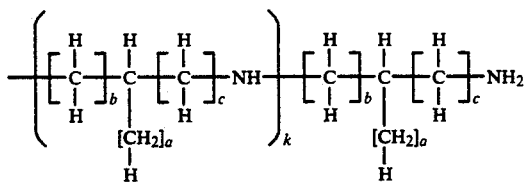

wherein a is an integer of from 1 to about 4, b and c are each integers of from 0 to about 4, wherein the sum of a+b+c is no greater than about 6, and k is an integer of from 0 to about 9;

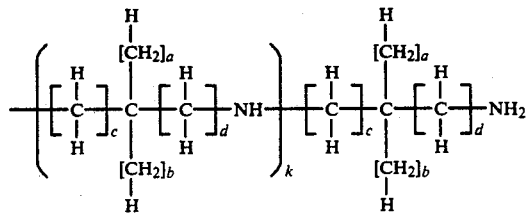

wherein a and b are each integers of from 1 to about 4, c and d are each integers of from 0 to about 4, wherein the sum of a+b+c+d is no greater than about 8, and k is an integer of from 0 to about 9;

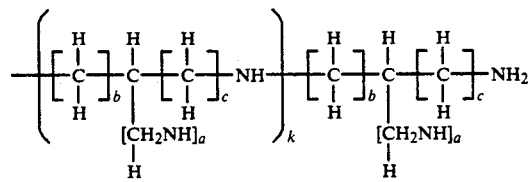

wherein a is an integer of from 1 to about 4, b and c are each integers of from 0 to about 4, wherein the sum of a+b+c is no greater than about 6, and k is an integer of from 0 to about 9;

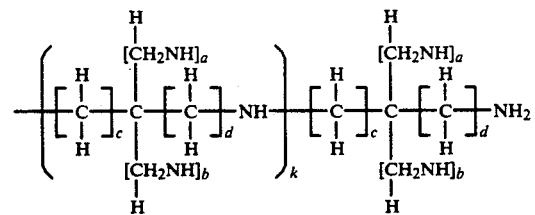

wherein a and b are each integers of from 1 to about 4, c and d are each integers of from 0 to about 4, wherein the sum of a+b+c+d is no greater than about 8, and k is an integer of from 0 to about 9;

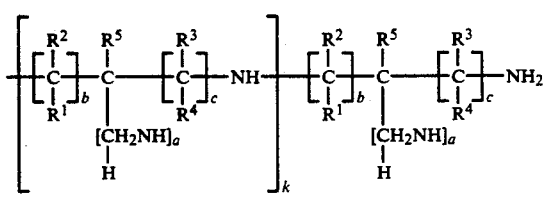

wherein a is an integer of from 1 to about 4, b and c are each integers of from 0 to about 4, wherein the sum of a+b+c is no greater than about 6, k is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10;

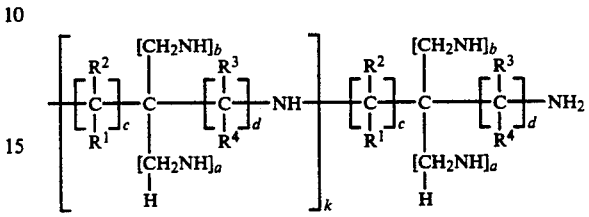

wherein a and b are each integers of from 1 to about 4, c and d are each integers of from 0 to about 4, wherein the sum of a+b+c+d is no greater than about 10, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8;

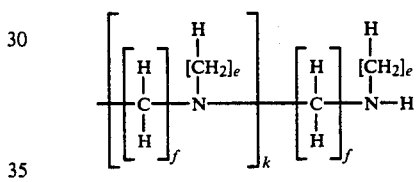

wherein e and f are each integers of from 1 to about 4, the sum of e+f is no greater than about 6, and k is an integer of from 0 to about 9;

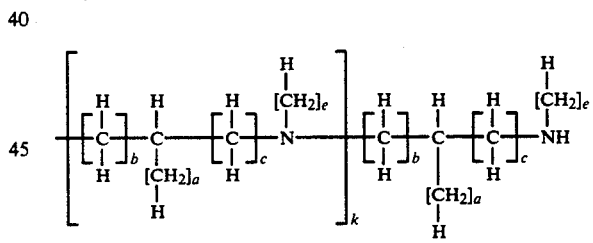

wherein a and e are each integers of from 1 to about 4, b and c are each integers of from 0 to about 4, wherein the sum of a+b+c+e is no greater than about 8, and k is an integer of from 0 to about 9;

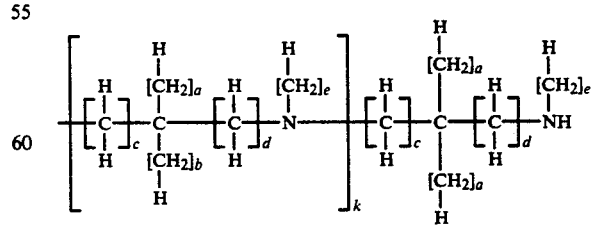

wherein a, b, and e are each integers of from 1 to about 4, c and d are each integers of from 0 to about 4, wherein the sum of a+b+c+d+e is no greater than about 10, and k is an integer of from 0 to about 9;

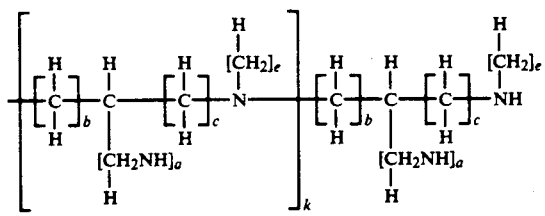

wherein a and e are each integers of from 1 to about 4, b and c are each integers of from 0 to about 4, wherein the sum of $a+b+c+e$ is no greater than about 8, and k is an integer of from 0 to about 9;

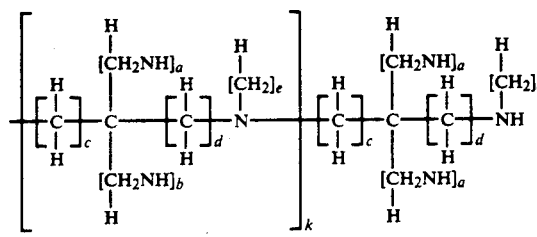

wherein a, b, and e are each integers of from 1 to about 4, c and d are each integers of from 0 to about 4, wherein the sum of $a+b+c+d+e$ is no greater than about 10, and k is an integer of from 0 to about 9;

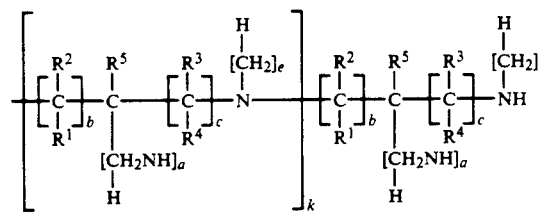

wherein a and e are each integers of from 1 to about 4, b and c are each integers of from 0 to about 4, wherein the sum of $a+b+c+e$ is no greater than about 8, m is an integer of from 0 to about 9, and $R^1$, $R^2$, $R^3$, $R^4$, and $R^5$ are independently selected from the group consisting of hydrogen, alkyl groups, and substituted alkyl groups, wherein the total number of carbon atoms in $R^1+R^2+R^3+R^4+R^5$ is from 1 to about 10; and

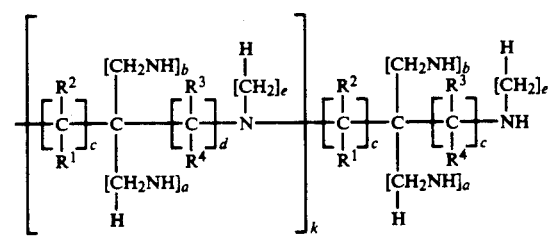

wherein a, b, and e are each integers of from 1 to about 4, c and d are each integers of from 0 to about 4, wherein the sum of $a+b+c+d+e$ is no greater than about 10, m is an integer of from 0 to about 9, and $R^1$, $R^2$, $R^3$, and $R^4$ are independently selected from the group consisting of hydrogen, alkyl groups, and substituted alkyl groups, wherein the total number of carbon atoms in $R^1+R^2+R^3+R^4$ is from 1 to about 8, and wherein the ink is a liquid.

35. An ink composition which comprises water, a water soluble dye, a first component selected from the group consisting of sulfones and mixtures thereof, and a second component which is a material selected from the group consisting of formylethanolamine, acetylethanolamine, propionyl ethanolamine, formyl n-propanolamine, acetyl n-propanolamine, propionyl n-propanolamine, and mixtures thereof, wherein the ink is a liquid.

36. A thermal ink jet printing process which comprises incorporating into a thermal ink jet printing apparatus an ink composition which comprises water, a water soluble dye, a first component selected from the group consisting of (a) sulfones of the formula

wherein $R^1$ and $R^2$ are independently selected from the group consisting of aliphatic hydrocarbons, substituted aliphatic hydrocarbons, aromatic hydrocarbons, substituted aromatic hydrocarbons, alcohol moieties, alkoxy moieties, and polyalkoxy moieties; (b) cyclic sulfones of the formula

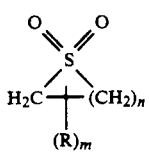

wherein R is an optional substituent, m is an integer representing the number of substituents, and n is an integer of at least about 4; (c) cyclic sulfones of the formula

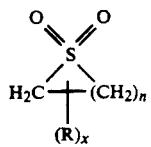

wherein R is a substituent selected from the group consisting of alkyl, hydroxy, alcohol, and alkoxy, x is an integer representing the number of substituents, and n is an integer of at least about 2; (d) cyclic sulfones of the formula

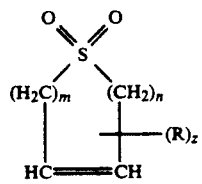

wherein R is an optional substituent, z is an integer representing the number of substituents, and m and n are integers independently selected from 0, 1, 2, and 3, wherein the sum of $m+n$ is at least about 1; (e) polysulfones; (f) cyclic polysulfones; (g) sulfonamides; and (h) mixtures thereof, and a second component selected from the group consisting of (a) cyclic amines having at least one hydrogen atom bonded to a nitrogen atom; (b) cyclic amides having at least one hydrogen atom bonded to a nitrogen atom; (c) diamides having at least one hydrogen atom bonded to a nitrogen atom; (d) amides of the formula

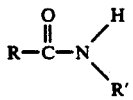

wherein R is a hydrogen atom or an alkyl group and R' is selected from the group consisting of alkoxy groups, polyalkoxy groups, imine groups, and polyimine groups; and (e) mixtures thereof, wherein the ink is a liquid, and causing droplets of the ink composition to be ejected in an imagewise pattern onto a substrate by selectively heating the ink in the nozzles in an imagewise pattern.

37. A thermal ink jet printing process which comprises incorporating into a thermal ink jet printing apparatus an ink composition which comprises water, a water soluble dye, a first component selected from the group consisting of sulfones and mixtures thereof, and a second component selected from the group consisting of (a) cyclic amines; (b) cyclic polyamines; (c) cyclic amides of the formula

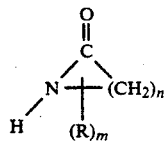

wherein R is an optional substituent, m is an integer representing the number of substituents, and n is an integer of at least about 4; (d) cyclic amides of the formula

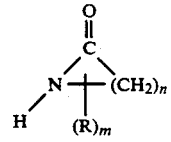

wherein R is a substituent selected from the group consisting of alkyl, alcohol, hydroxy, and alkoxy, m is an integer representing the number of substituents, and n is an integer of at least about 3; (e) cyclic amides of the formula

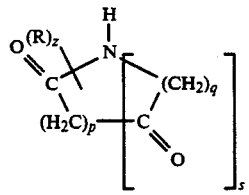

wherein R is an optional substituent, z is an integer representing the number of substituents, p and q are each integers selected from the group consisting of 0, 1, 2, 3, and 4, wherein the sum of p+q is at least about 1, and s is an integer of from 1 to about 4; (f) cyclic amides of the formula

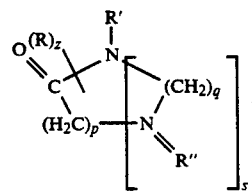

wherein R is an optional substituent, z is an integer representing the number of substituents, p and q are each integers selected from the group consisting of 0, 1, 2, 3, and 4, wherein the sum of p+q is at least about 1, s is an integer of from 1 to about 4, and R' and R" are independently selected from the group consisting of hydrogen, alkyl, substituted alkyl, aryl, substituted aryl, alcohol, alkoxy, and polyalkoxy, wherein at least one of R' and R" is hydrogen; (g) cyclic polyamides; (h) diamides having at least one hydrogen atom bonded to a nitrogen atom; (i) amides of the formula

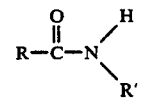

wherein R is a hydrogen atom or an alkyl group and R' is selected from the group consisting of alkoxy groups, polyalkoxy groups, imine groups, and polyimine groups; and (j) mixtures thereof, wherein the ink is a liquid, and causing droplets of the ink composition to be ejected in an imagewise pattern onto a substrate by selectively heating the ink in the nozzles in an imagewise pattern.

* * * * *